US007315903B1

(12) United States Patent
Bowden

(10) Patent No.: US 7,315,903 B1
(45) Date of Patent: Jan. 1, 2008

(54) SELF-CONFIGURING SERVER AND SERVER NETWORK

(75) Inventor: Tommy H. Bowden, Huntsville, AL (US)

(73) Assignee: Palladia Systems, Inc., Huntsville, AL (US)

( * ) Notice: Subject to any disclaimer, the term of this patent is extended or adjusted under 35 U.S.C. 154(b) by 725 days.

(21) Appl. No.: 10/200,721

(22) Filed: Jul. 22, 2002

Related U.S. Application Data

(60) Provisional application No. 60/306,723, filed on Jul. 20, 2001.

(51) Int. Cl.
*G06F 15/16* (2006.01)
*G06F 15/173* (2006.01)

(52) U.S. Cl. .................. 709/250; 709/224; 709/251

(58) Field of Classification Search ........... 709/220, 709/223, 224, 250, 251
See application file for complete search history.

(56) References Cited

U.S. PATENT DOCUMENTS

| 5,109,486 | A | * | 4/1992 | Seymour | 709/224 |
|---|---|---|---|---|---|
| 5,404,549 | A | * | 4/1995 | Tausheck | 707/4 |
| 5,761,507 | A | * | 6/1998 | Govett | 718/101 |
| 5,768,552 | A | * | 6/1998 | Jacoby | 345/441 |
| 5,774,668 | A | * | 6/1998 | Choquier et al. | 709/223 |
| 5,878,420 | A | * | 3/1999 | de la Salle | 707/10 |
| 5,923,646 | A | * | 7/1999 | Mandhyan | 370/254 |
| 6,032,194 | A | * | 2/2000 | Gai et al. | 709/239 |
| 6,085,234 | A | * | 7/2000 | Pitts et al. | 709/217 |
| 6,167,446 | A | * | 12/2000 | Lister et al. | 709/223 |
| 6,249,801 | B1 | * | 6/2001 | Zisapel et al. | 718/105 |
| 6,321,338 | B1 |  | 11/2001 | Porras et al. |  |
| 6,360,256 | B1 | * | 3/2002 | Lim | 709/223 |
| 6,434,611 | B1 | * | 8/2002 | Wilson et al. | 709/221 |
| 6,484,203 | B1 |  | 11/2002 | Porras et al. |  |
| 6,490,244 | B1 | * | 12/2002 | Pegrum et al. | 370/216 |
| 6,553,405 | B1 | * | 4/2003 | Desrochers | 709/203 |
| 6,571,288 | B1 | * | 5/2003 | Sarukkai | 709/226 |
| 6,587,970 | B1 | * | 7/2003 | Wang et al. | 714/47 |
| 6,601,084 | B1 | * | 7/2003 | Bhaskaran et al. | 718/105 |
| 6,664,978 | B1 | * | 12/2003 | Kekic et al. | 715/733 |
| 6,728,207 | B1 | * | 4/2004 | Askinger et al. | 370/224 |
| 6,816,898 | B1 | * | 11/2004 | Scarpelli et al. | 709/224 |
| 6,898,727 | B1 | * | 5/2005 | Wang et al. | 714/4 |
| 6,976,065 | B2 | * | 12/2005 | Kaiser et al. | 709/221 |
| 2003/0046394 | A1 | * | 3/2003 | Goddard et al. | 709/226 |
| 2005/0259571 | A1 | * | 11/2005 | Battou | 370/217 |

* cited by examiner

*Primary Examiner*—William Vaughn
*Assistant Examiner*—Yemane M Gerezgiher
(74) *Attorney, Agent, or Firm*—Mark Clodfelter

(57) ABSTRACT

A self-configuring server system is disclosed. In this system, a plurality of nodes are linked together in a primary loop. Each node includes an external communication interface coupled to the loop, a command module for controlling the node and an internal interface. The internal interface, for each node, is in turn coupled to an internal loop associated with that node, the internal loop defining operation of that node. Messages and data circulate around the primary loop until reaching an appropriate node, where the message or data is acted upon. In some instances the messages or data is client-related, and in other instances the messages or data provide for dynamic reconfiguration of the system. In yet other instances, the messages or data is transmitted from one or more nodes in order to provide operational data about the node/nodes to a plurality of system controllers. Components in the loop also may receive information from components not in the loop but associated with the system, such as virile entities, that are used for monitoring and control.

14 Claims, 27 Drawing Sheets

CM_DGM

DESCRIPTION OF TERMS USED TO
DESCRIBE THE CHAIN COMMUNICATION
INTERFACE (CI) AND RELATED
COMMUNICATION INTERFACES

| Figure: | CM_DGM |
|---|---|
| Description: | Major parts of a Chain CI |
| Revision: | 7/2/2001 |
| Revision By: | Tom Bowden |
| Figure Number | |

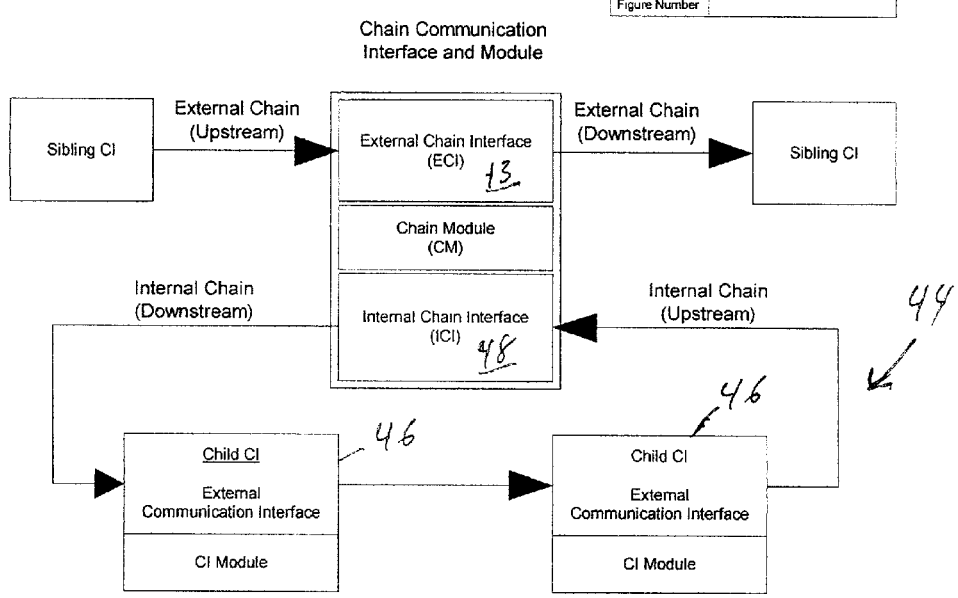

Communication Interface: A Communications Interface is a common component of the Server System that provides for the transfer of information between components of the System. This component consists of an external interface, and an associated Communication Interface Module (CIM). The CIM provides functionality to the Server System through an embedded (linked) Module Controller, or an external application that is accessed via a common Application Programming Interface.

Each CI has a set of Input Channels, a set of Output Channels, and a Discovery/Control Channel. The Input and Output Channels may be implemented using IP Addresses with TCP Ports, IPC/RPC constructs, or Shared Memory. The Discovery/Control Channel is always implemented using a well known TCP Port.

The Input, Output, and Discover/Control channels communicate using a proprietary communication protocol that consists of definable message types and varying levels of authentication and acknowledgement.

Chain: A collection of one or more communication interfaces linked via the input and output channels and controlled by a Chain Communication Interface.

External Communication Interface: The communication portion of a CI that interfaces with an external chain (external to the CI).

Internal Communication Interface: The communication portion of a Chain Communication Interface Module that communicates with a chain of CI that the module controls.

FIG. 3

CP_DGM

| Figure. | CP_DGM |
|---|---|
| Description: | ACP Message Format |
| Revision | |
| Revision By | |
| Figure Number | |

ACP MESSAGE HEADER

| Version | Header Length | ACP Message Type | Total Length | Urgency | Conversation ID |
|---|---|---|---|---|---|
| Sequence Type | Sequence | Current Source | Current Destination | | Current ACI Type |
| Current ACI Family | Status | Max TTL | Accumulated Time | | |

Module Block Flags

| Addresses | Support | Client Data | System Data | Gene | Tickets | Timers |
|---|---|---|---|---|---|---|
| Environmental Limits | Module | Configuration | Result Data | Status | Tunneling | |

ADDRESS MESSAGE BLOCK

| ACI Message Block Version | Address Block Sequence | Record Count | |
|---|---|---|---|

Operational Path (Route)

| ACI ID | Type | Family | Counter | Status | Max TTL | Time | Machine | SystemID | Flags |
|---|---|---|---|---|---|---|---|---|---|
| ACI ID | Type | Family | Counter | Status | Max TTL | Time | Machine | SystemID | Flags |
| ACI ID | Type | Family | Counter | Status | Max TTL | Time | Machine | SystemID | Flags |
| ACI ID | Type | Family | Counter | Status | Max TTL | Time | Machine | SystemID | Flags |

TICKET MESSAGE BLOCK

| Ticket Block Version | ACI Type | ACI Family | ACI ID | Ticket Count |
|---|---|---|---|---|

Ticket(s)

| Ticket ID | Type | ObjID | CRC16 | Length | Data |
|---|---|---|---|---|---|
| Ticket ID | Length | ObjID | CRC16 | Length | Data |

SYSTEM DATA MESSAGE BLOCK

| Data Count | Encryption Method | Public Key | Data Checksum | Data Count |
|---|---|---|---|---|

Data Code(s)

| Name | Type | Value | Name | Type | Value | Name | Type | Value | Name | Type | Value |
|---|---|---|---|---|---|---|---|---|---|---|---|
| Name | Type | Value | Name | Type | Value | Name | Type | Value | Name | Type | Value |

CLIENT DATA MESSAGE BLOCK

| Data Count | Encryption Method | Public Key | Data Checksum | Data Count |
|---|---|---|---|---|

Data Code(s)

| Name | Type | Value | Name | Type | Value | Name | Type | Value | Name | Type | Value |
|---|---|---|---|---|---|---|---|---|---|---|---|
| Name | Type | Value | Name | Type | Value | Name | Type | Value | Name | Type | Value |

RESULTS DATA MESSAGE BLOCK

| Data Count | Encryption Method | Public Key | Data Checksum | Data Count |
|---|---|---|---|---|

Data Code(s)

| Name | Type | Value | Name | Type | Value | Name | Type | Value | Name | Type | Value |
|---|---|---|---|---|---|---|---|---|---|---|---|
| Name | Type | Value | Name | Type | Value | Name | Type | Value | Name | Type | Value |

FIG. 4

LOGON_CONV_DGM

INTEGRATION_CONV_DGM

STATUS_QRY_CONV_DGM

TICKET_DGM

| Figure | TICKET_DGM |
|---|---|
| Description | Ticket Message Format |
| Revision | |
| Revision By | |
| Figure Number | |

TICKET HEADER

| Version | Ticket ID | Ticket Type | ObjID | CRC |
|---|---|---|---|---|

PASSPHRASE TICKET BLOCK

| Version | Count | Length | |
|---|---|---|---|

Passphrase(s)

| Type | ID | Length | DATA |
|---|---|---|---|
| Type | ID | Length | DATA |
| Type | ID | Length | DATA |

ID TICKET BLOCK

| Version | Count | Length | |
|---|---|---|---|

ID(s)

| ID | Type | Length | Data (To be matched by pass phrases) |
|---|---|---|---|
| ID | Type | Length | Data (To be matched by pass phrases) |

ACCESS RESTRICTIONS TICKET BLOCK

| Version | Count | Total Length | Max Restriction Header Length |
|---|---|---|---|

Restriction Header(s) with Name Values

| ID | Restriction Type | Object ID | Length | | | | | | | |
|---|---|---|---|---|---|---|---|---|---|---|
| Name | Type | Value | Name | Type | Value | Name | Type | Value | Name | Type | Value |
| Name | Type | Value | Name | Type | Value | Name | Type | Value | Name | Type | Value |

| ID | Restriction Type | Object ID | Length | | | | | | | |
|---|---|---|---|---|---|---|---|---|---|---|
| Name | Type | Value | Name | Type | Value | Name | Type | Value | Name | Type | Value |
| Name | Type | Value | Name | Type | Value | Name | Type | Value | Name | Type | Value |

VALIDITY TICKET BLOCK

| Version | Flag | Count | Total Length | Max Validity Header Length |
|---|---|---|---|---|

Validity Item(s)

| ID | Validity Type | Data |
|---|---|---|
| ID | Validity Type | Data |

CONFIGURATION TICKET BLOCK

| Version | Count | Total Length | Max Configuration Header Length |
|---|---|---|---|

Configuration Header with Name/Value Pairs

| ID | Configuration Type | Object ID | Length | | | | | | | |
|---|---|---|---|---|---|---|---|---|---|---|
| Name | Type | Value | Name | Type | Value | Name | Type | Value | Name | Type | Value |
| Name | Type | Value | Name | Type | Value | Name | Type | Value | Name | Type | Value |

| ID | Configuration type | Object ID | Length | | | | | | | |
|---|---|---|---|---|---|---|---|---|---|---|
| Name | Type | Value | Name | Type | Value | Name | Type | Value | Name | Type | Value |
| Name | Type | Value | Name | Type | Value | Name | Type | Value | Name | Type | Value |

FIG. 8

OP_PATH_DGM

Examples of the operational path, and adjustments made by various server sysetm components.

| Figure. | OP_PATH_DGM |
|---|---|
| Operation: | OSC Paths |
| Revision: | 7/2/2001 |
| Revision By: | Tom Bowden |
| Figure Number: | |

MODIFICATION ONE

OPERATIONAL PATH CREATED BY DECODER MODULE (PIM)
* AS PART OF THE TRANSLATION PROCESS THE PIM WILL ASSIGN A PATH BASED ON THE MESSAGE TYPE AND COMMAND

MODIFICATION TWO

INTELLIGENT AGENTS ASSIGN MESSAGE TO SERVER
* THE INTELLIGENT AGENTS MAINTAINS INFORMATION ON EACH SERVER AND MODIFIES PATH TO ROUTE TO A SPECIFIC SERVER

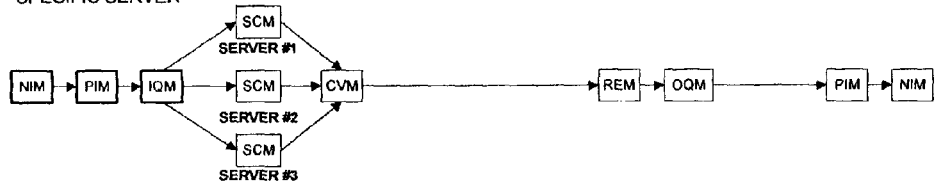

MODIFICATION THREE

SERVER (SCM) MODIFIES OPERATIONAL PATH BASED ON CI PERFORMANCE STATISTICS
* THE SERVER COMPARES STATISTICS FOR EACH CI SPECIFIED BY FAMILY AND ROUTES BASED ON CI LOAD AND TURN AROUND TIME. PATH (NETWORK) SEGMENTS TO CI's MAY BE MODIFIED AS WELL.

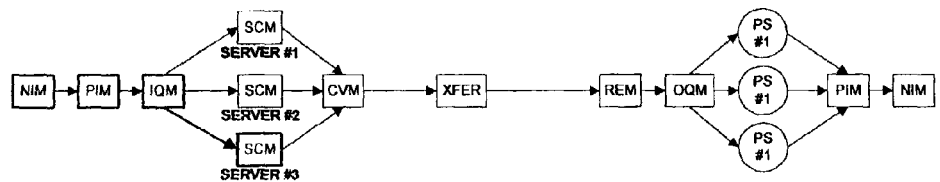

MODIFICATION 'X'

ANY CHAIN CI MAY MODIFY OPERATIONAL PATH
* ANY CHAIN CI (SPECIFIED IN THE OPERATIONAL PATH) MAY MODIFY CI'S THAT ARE SPECIFIED BY CI FAMILY. PATH (NETWORK) SEGMENTS MAY ALSO BE MODIFIED BASED ON BANDWIDTH, LATENCY, AND AVAILABILITY.

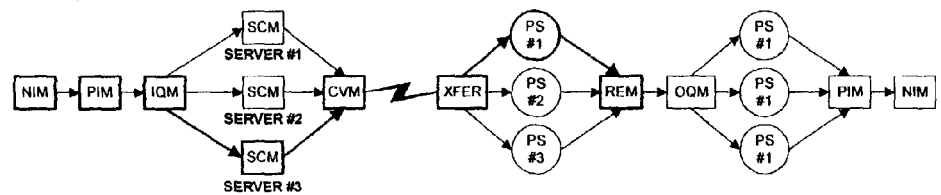

FIG. 9

QUEUE_BYTES_DGM

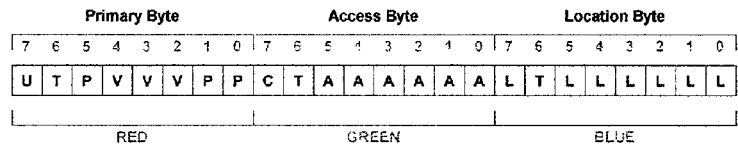

| RGB | Message Queue | Path Element | Nexus |
|---|---|---|---|
| Primary Byte | RED | GREEN | BLUE |
| Access Byte | GREEN | RED | RED |
| Location Byte | BLUE | BLUE | GREEN |

```
      Primary Byte              Access Byte              Location Byte
 7 6 5 4 3 2 1 0 | 7 6 5 4 3 2 1 0 | 7 6 5 4 3 2 1 0
 U T P V V V P P | C T A A A A A L | T L L L L L L
 |_____| |_____| |_____|
        RED               GREEN             BLUE
```

U Urgent Bit. Set when there is a problem that must be investigated immediately

T Type Bit. Each byte has a type bit that determines type of queue element represented by Queue Pixel
    - RED: Type is Message Queue Element
    - GREEN: Type is Path Element
    - BLUE: Type is Nexus Element P Priority Bits: Bits 5,1, and 0 of the Primary byte indicate the priority of the element represented by the Queue Pixel. Interpretation of this value is based on the type of queue element represented
    - Message Queue. Indicates the priority of messages that will be stored in represented message queue
    - Path Element: Indicates the priority of highest message currently in a queue attached to a descendant of the path element
    - Nexus Element: Indicates the priority of the highest message currently in a queue attached to the nexus.

V Capacity Bits: Bits 2,3 and 4 of the Primary Byte indicates the current amount of storage or bandwidth currently used in the element represented by the Queue Pixel. To arrive at a value that wil this fit in these three bytes the current level of resources is divided by the total capacity of the resources and then multipled by 8. The interpretation of this value is based on the type of element represented by the Queue Pixel. For:
    - Message Queue: The current number of messages in the queue divided by the total number of messages in the queue.
    - Path Element: The current number of messages in the queues of all descendant nexus' connected to the Path.
    - Nexus: The current number of messages in all attached queues divided by the maximum capacity of all attached queues.

C Client Access Bit: This bit indicates that the last server system component to access the element represented by the Queue Pixel was a process communicating directly with a client or client application.

A Agent Type Bits: If Bits 0-5 of the Access Byte contain any value other than 0x0 then the value will contain a type (that identifies an Intelligent Agent with a specific functionality) and indicate that the last server system component to access the element represented by the Queue Pixel was an Intelligent Agent L Location (Level) Bits: Bits 0-5 and 7 of the Location byte identifies the level (relative to the Client Insertion Point) of the Queue Image Map that the Queue Pixel is located in. If Bit 7 is set then bits 5-0 indicate a level from 64 to 191. If Bit 7 is not set then bits 5-0 indicate a level from 0 to 63.

FIG. 16

QUEUE_NAV_DGM

CI_DETAIL_DGM

CM_DETAIL_DGM

SELF-CONFIGURING SERVER AND SERVER NETWORK

CROSS REFERENCE TO RELATED APPLICATIONS

This application claims priority to the provisional patent application Ser. No. 60/306,723, filed on Jul. 20, 2001.

FIELD OF THE INVENTION

This invention relates generally to data servers and data server networks and protocols, and particularly to a server or server network having modular, dynamically linking components that are configured responsive to a central controller, and in response to server utilization by external applications and clients to perform different functions and optimize performance.

BACKGROUND OF THE INVENTION

A number of protocols exist today by which data servers may be linked together. Typically, a pool of dedicated servers, which may include data base servers, file servers and printer servers, are found in a local network, these servers located at a single centralized location, such as in one room of a large building. The servers are linked together and to multiple remote users, or clients, in distant parts of the building by a cable system, which may include category 5 cables, optical cable or any other linking system that allows these data servers and the remote clients to communicate. The server pool may include a router coupled to the Internet, which provides Internet access to at least some of the clients of the system and/or an administrator of the system. In other systems, such as the Internet, a vast number of servers are located throughout the world, and communicate via common protocols.

In some instances the server pool or network may handle other types of data, such as monitoring building or plant facility functions which may include elevator operation, heating/cooling, fire and intruder alarm systems, and other operations related to operation of a large building or other facility. In this instance, a single server of the pool of servers may have applications configured to handle these operations. In these applications, and with growing use of hand-held computing devices (personal digital assistants, or PDAs), such as Palm Pilot-type devices, another server in the pool may be configured to handle PDA data. Yet another server may be configured to handle cell to telephone traffic. Of course, each of these different types of devices has its own protocol with respect to routing, transmission, etc., requiring that there be a multitude of servers, or at least programs, to keep track of and handle data from these various sources. In addition, each of these servers or programs for handling different types of data is typically allocated a fixed amount of resources such as computer memory, operating environment and mass storage memory, i.e. hard drive storage, optical storage, and so forth. As such, a situation may arise wherein one program or server may be overloaded with respect to its capacity of allocated resources while other servers or programs are sitting idle or only operating under a light load. Additionally, in a widely distributed system, the complexity of managing the configuration of each component in the system presents problems with respect to coordinating different components, protocols, operating systems and other factors. For example, specialized programs may need to be written in order to compile/decompile transferred data across machine and protocol boundaries. These logistical problems in general tend to stack up and cause the distributed system to run less efficiently than would otherwise be the case.

Accordingly, it is one object of the invention to provide a server system or network wherein protocols for handling data are configured as the data is received, thereby eliminating a need for maintaining a program or server for each different type of data. It is another object of the invention to provide a server or network system wherein system resources are allocated as they are needed. Further objects of the invention include: providing a configurable method of collecting data from heterogeneous sources, providing a configurable control interface to manage heterogeneous devices and data sources, providing a configurable method of securely transferring collected data, command and control instructions and status information about the server system and attached external devices and data sources, providing a configurable method of formatting information in a common format that is then converted to user specifications for input and display to devices such as Internet enabled cell phones, PDAs, and third party applications or programmable interfaces, providing a configurable method for transmitting information across the server system to the above-mentioned user specified devices across various extensible media including, but not limited to, Ethernet, serial cables and analog/digital circuits, providing a server system that is dynamically able to reconfigure itself based on available resources, levels of server system usage and configurable extensible time schedules, providing, in one embodiment, a server system that forecasts future system configuration needs based on real-time analysis of system load and historical analysis of past trends in system load and resource availability, providing, in another embodiment, a server system divided into two subsystems, a neutral exchange server subsystem and a "guardian" subsystem wherein the guardian subsystem provides dynamic reconfiguration, providing a server system that is highly fault-tolerant through the use of redundant system components and circuits with real-time selection of server system components and aforementioned circuits based on availability, transmission speeds and utilization factors, providing a server system that is securely extensible through the use of authentication methods provided at runtime and defined by both the server system and administrators of the server system, providing a server system that uses intelligent agents (independent processes) to identify potentially malicious attacks from computer virus by monitoring a volume of incoming and outgoing server system traffic and by using intelligent agents (in the guardian subsystem) to search for recognizable virus patterns (footprints) in user data transmitted through, and maintained by, the server system, providing for interface to third party virus packages (such as Norton™, VirusShield™, etc.) to add a higher level of assurance for newly found virus, and for providing an interface to public news servers for the receipt and transmission of hours reports.

BRIEF DESCRIPTION OF THE DIAGRAMS

FIG. 3 illustrates the functional parts of a chain communication interface and the communication interfaces that are located on the external and internal chains associated with the chain communication interface.

FIG. 4 is a specification of a communication protocol used by the Applicant's server system for transferring information between communication interfaces.

FIG. 8 is a specification for the communication protocol tickets used by the server system.

FIG. 9 is a diagram showing the components of an example operational path and modifications that may be made to the operational path by various server system components.

FIG. 16 provides details of the assignment of bytes in the queue pixel and the bitmap assignments for each byte of the queue pixel.

Figure 17:
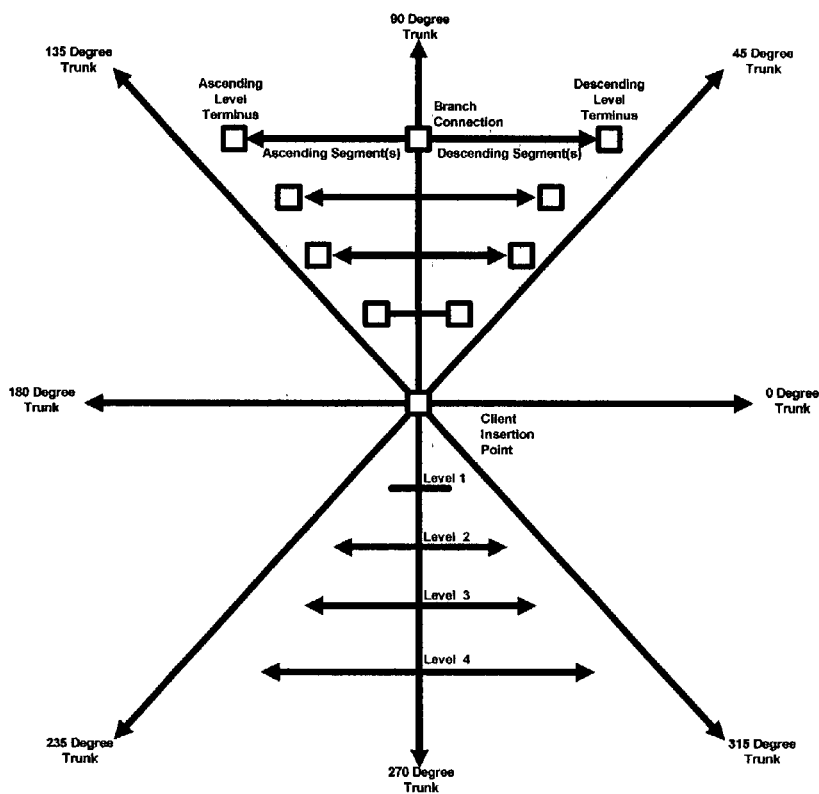

FIG. 17 shows navigational terms associated with the queue image map that is used to represent the current content and status of elements of the tree queue (including nexus, paths, and message queues).

Figure 18:
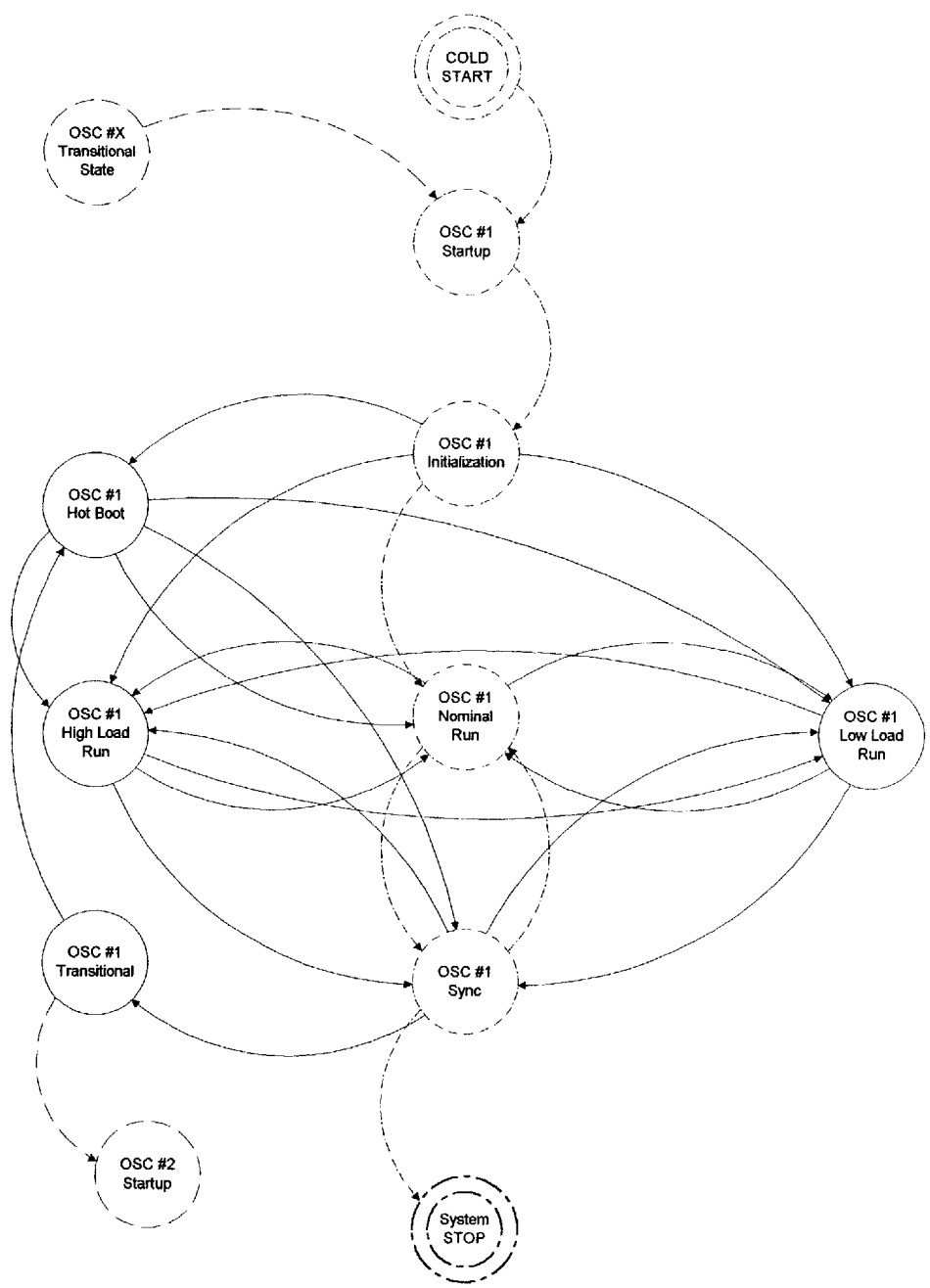

FIG. 18 is an augmented transitional state diagram showing an example operational system configuration with various example states. The states in dash-dot lines are required and cannot be removed from the OSC. The states in dashed lines are transitional states that are used to connect multiple operational system configurations together, and the states in solid lines are examples of states that may be created by customer. The transitions between states (the curved lines and arrows) are triggered by changes in conditions monitored by the server system.

Figure 19:
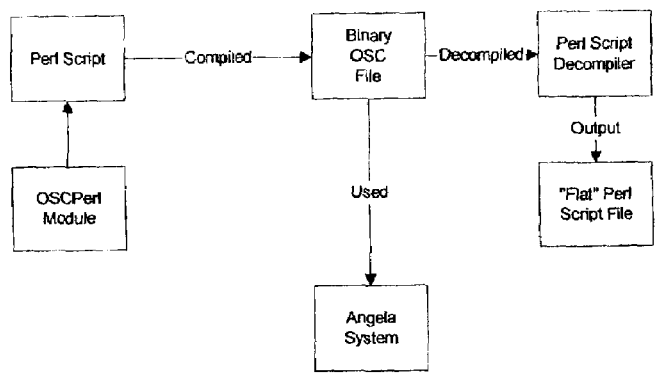

FIG. 19 is a functional block diagram showing the compilation and de-compilation of operational system configuration files.

Figure 20:
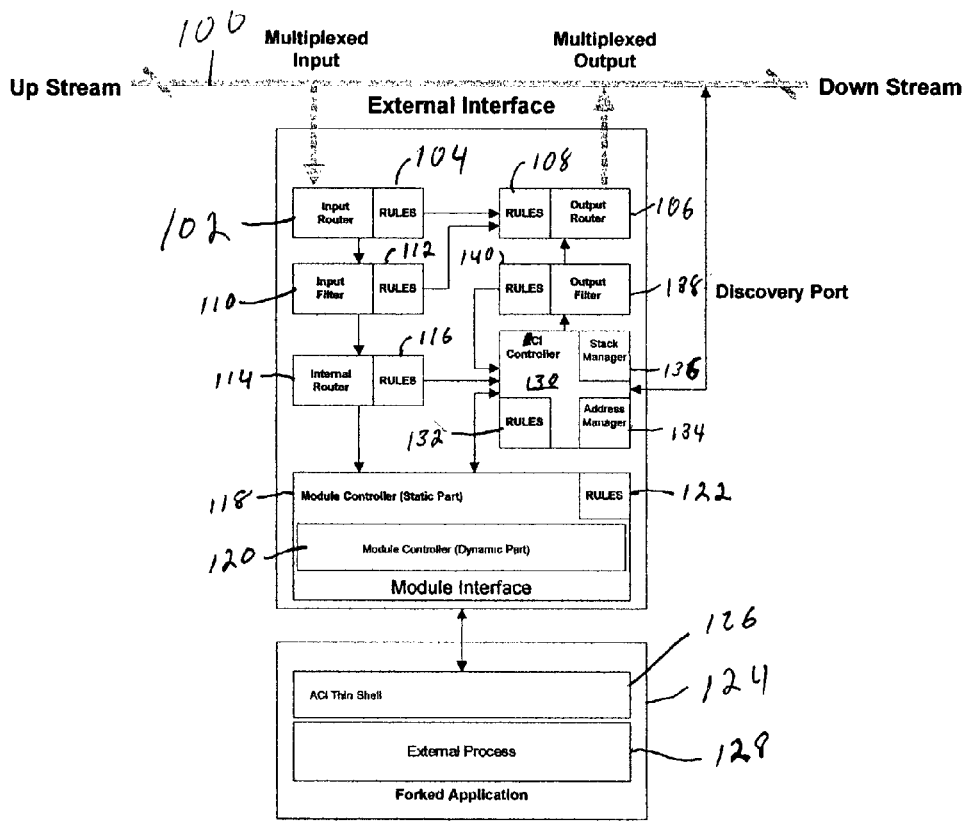

FIG. 20 is a functional block diagram of a proprietary communication interface used by the applicant's server system for adding specific functionalities to the server system.

Figure 21:
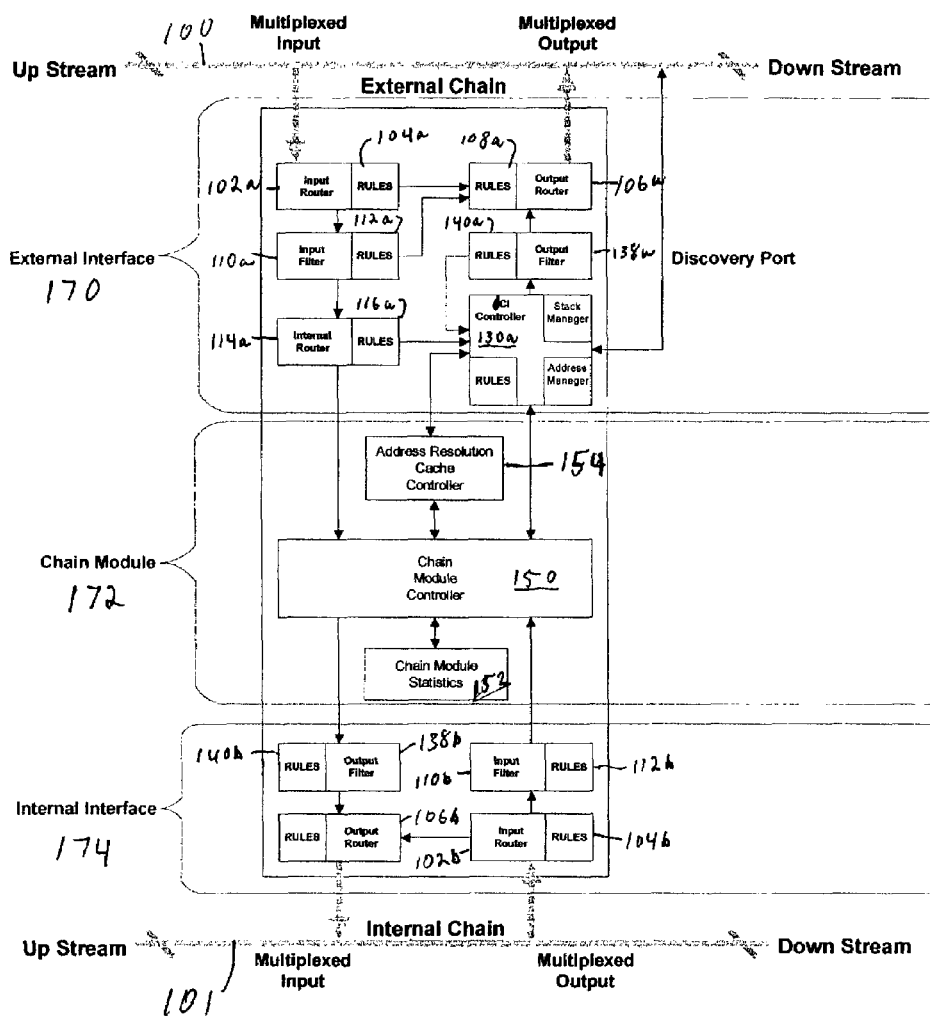

FIG. 21. is a block diagram showing the individual parts of a chain communication interface.

Figure 22:
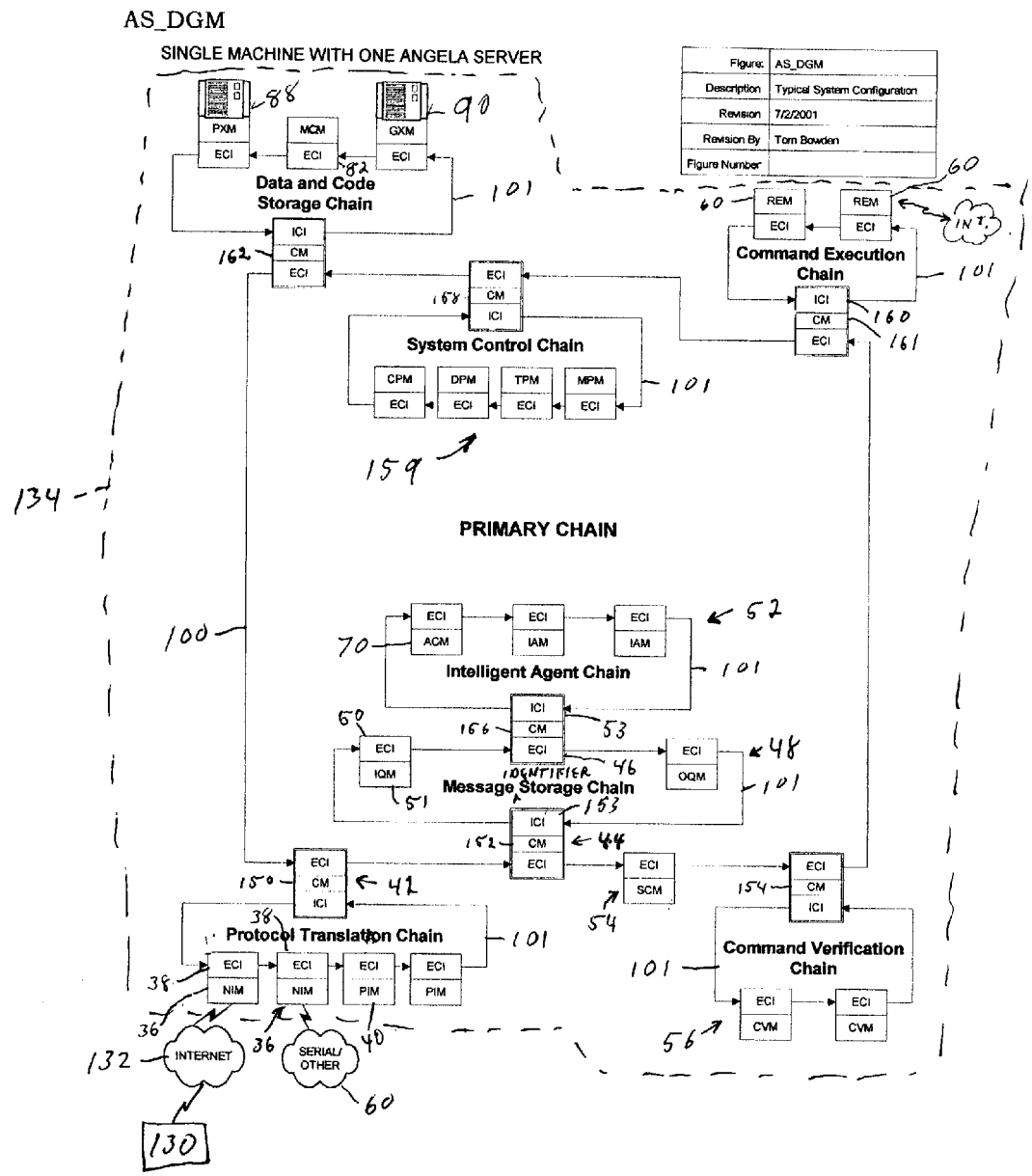

FIG. 22 illustrates, by way of example, one typical server system configuration upon which the instant invention may be implemented using communication interfaces to transfer information between various components and modules of the server system.

Figure 23:
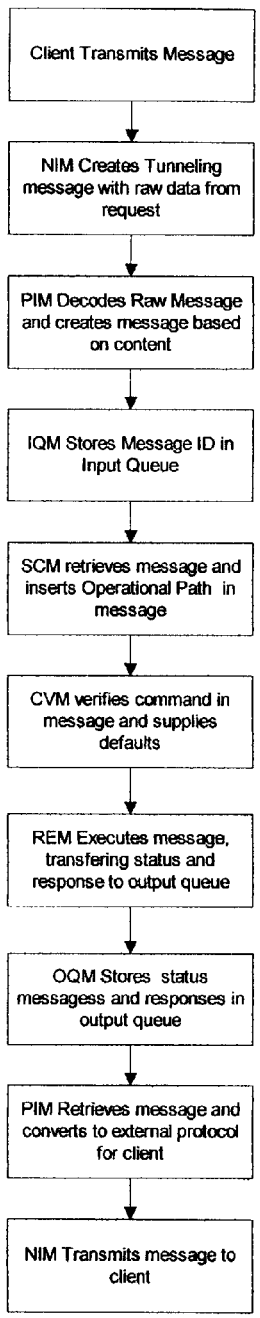

FIG. 23 is a flowchart showing one example of the flow of a message from the client to the server system, and back to the client.

Figure 24:
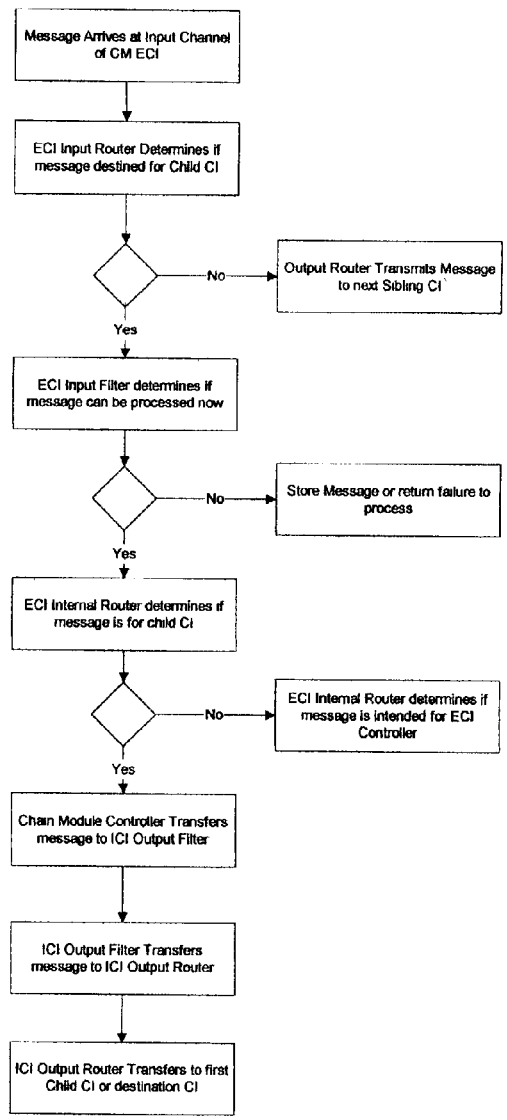

FIG. 24 is a flowchart showing the flow of a message between two chains using a chain communication interface.

Figure 25:
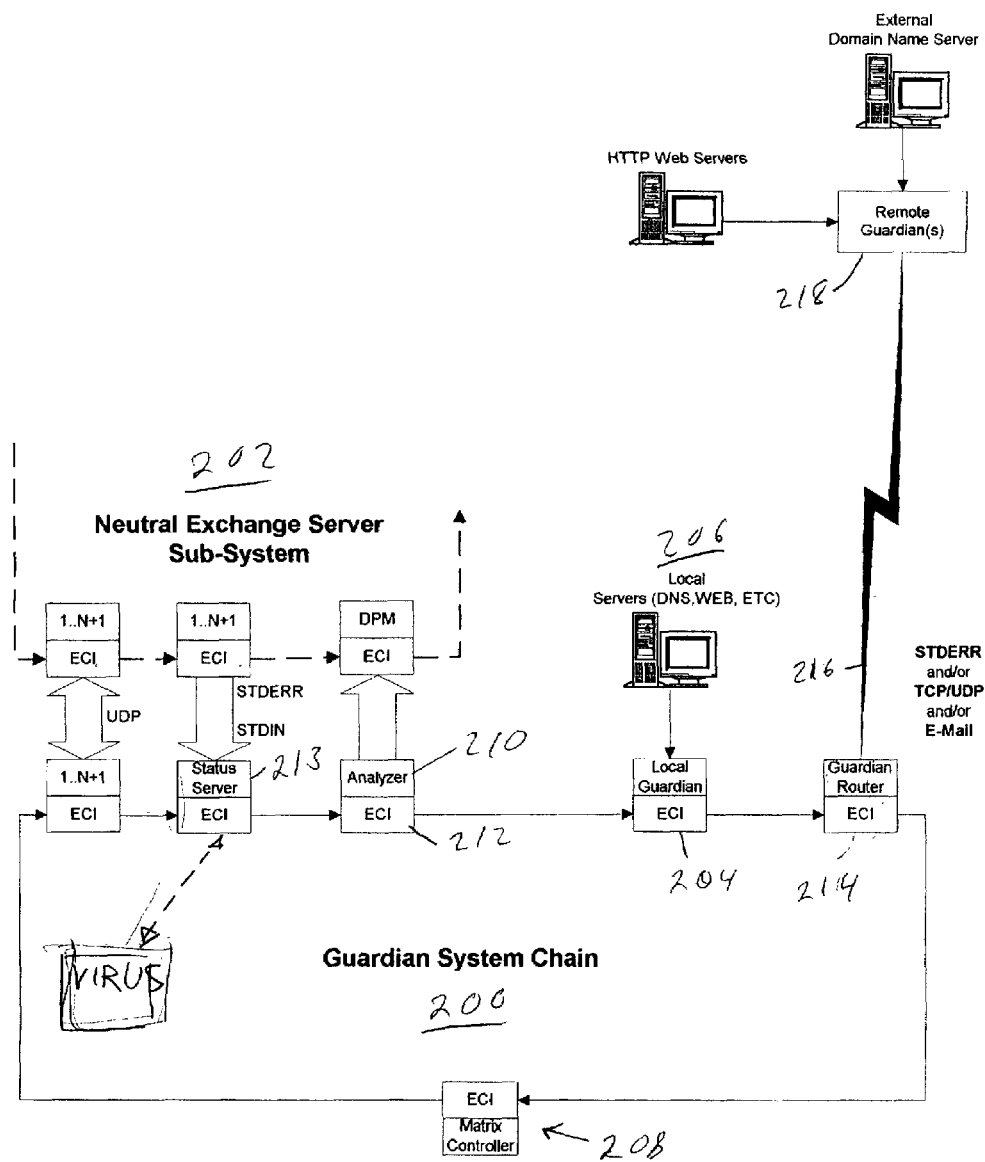

FIG. 25 is a block diagram generally illustrating construction of a virus-like entity of the present invention.

Figure 26:
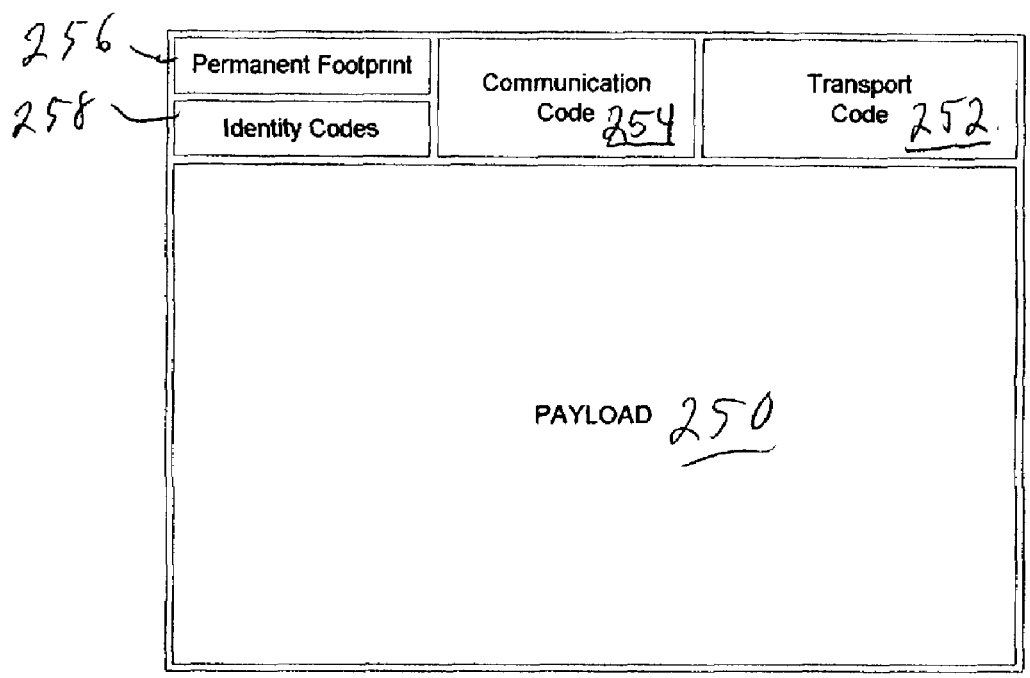

FIG. 26 is a block diagram illustrating a guardian subsystem of the present invention.

DETAILED DESCRIPTION OF THE DRAWINGS

Figure 1:
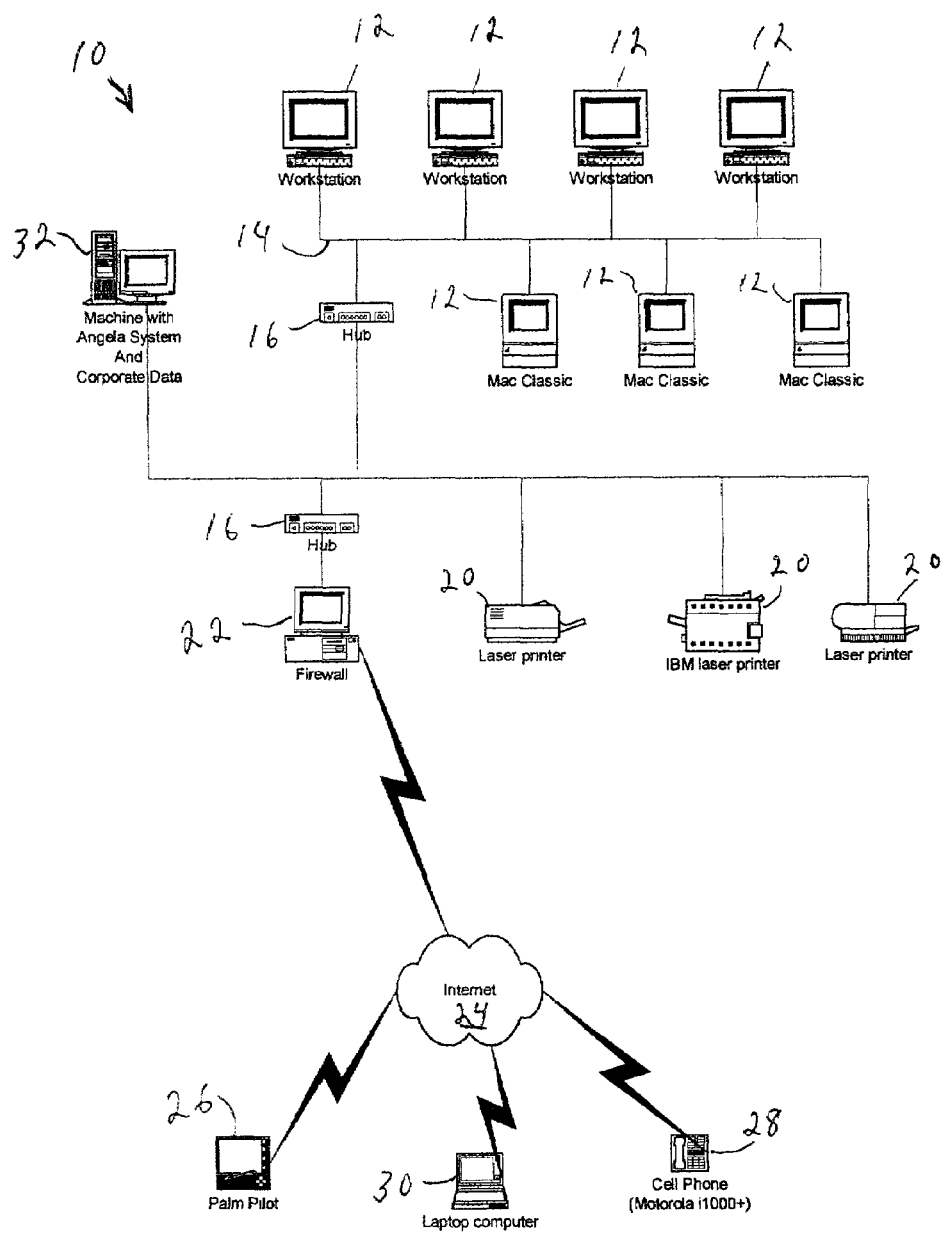
FIG. 1 is a block diagram of a computer data network for a typical customer of the applicant's invention, one or more client devices used to access the server system, and one or more devices attached to the server system that are monitored by the system.

FIG. 1 illustrates, by way of example, a typical network system 10 upon which the instant invention may be implemented. Here, a plurality of user or clients 12 are coupled via a network link 14, which may be category 5 twisted pair cable, a fiber optic link or any other network link, to one or more network hubs 16. Also shown connected to these network hubs 16 are printers 20 and a firewall server 22 through which an Internet connection is provided to Internet 24 to give access to the Internet to any or all of the client machines 12. The Internet link allows users of Palm Pilot-type devices 26, internet-enabled cellular telephones 28 and other devices, such as a laptop computer 30, to communicate with network 10. In addition, a machine 32 coupled to hubs 16 and printers 20 may be loaded so as to implement Applicant's network system and to store databases or other corporate data. While a typical server system is shown in FIG. 1, it is to be emphasized that Applicant's server system may reside in a single desktop computer or server computer, or be distributed between any number of computing devices, such as palm computers, cellular telephones and other computing devices.

In this disclosure, the designation CI is used in places to designate a communication interface of Applicant's invention. In other places, these interfaces are simply described as "communication interfaces". These communications interfaces, together with command modules, form nodes or modules coupled to form chains or loops that may span multiple machines and use a wide variety of methods and transfer protocols to transfer information. Each communication module possesses a configurable, but limited, level of intelligence to respond to changing conditions.

Figure 2:
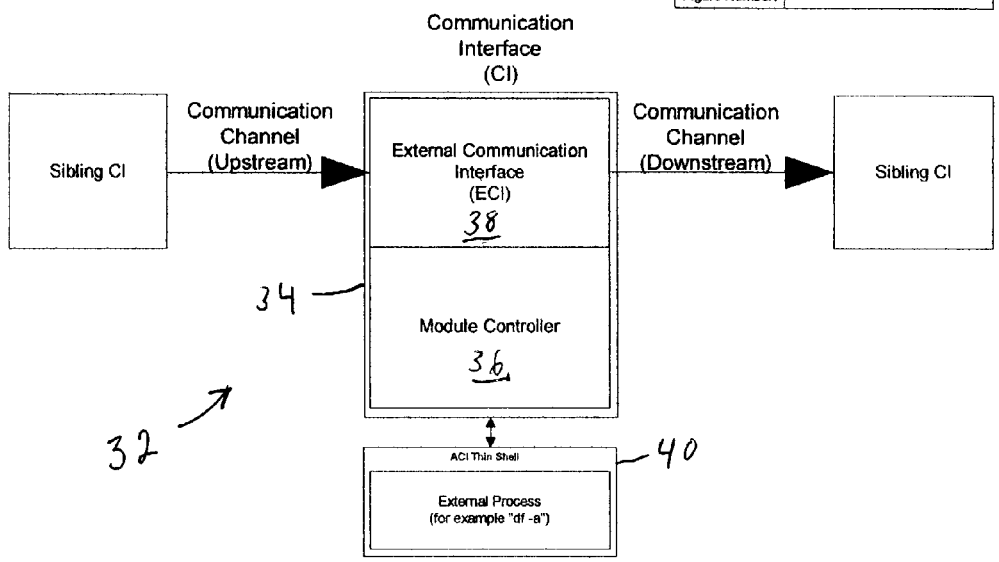
FIG. 2 is a block diagram showing the major components of a Communication Interface with an optional application (ACI Thin-Shell) that is used to interface with third party applications such as UNIX's diskspace command (df-a).

Referring now to FIG. 2, each communication interface 32 has a unique 16-Bit ID assigned by the base operational system configuration file for the customer's site that the server system is installed at. In situations where particular communication interfaces may be integrated into the server system as needed or where multiple copies of one communication interface may be created, the ID's for these communication interfaces are reserved for each possible instantiation of the communication interface.

The communication interfaces may be implemented as multi-threaded independent processes, and written to run on any supported platform whether it is Macintosh™, Windows/NT™ or PalmOS™ (to name a few by way of example). Characteristics such as a platform that a communication interface is written for are specified in a 512-Bit Type field that is statically compiled into the CI. Each communication interface has a defined functionality that is implemented through the use of an associated communication interface module 34 that includes a module controller 36 and a module interface 38 that may be dynamically altered or reconfigured. If the defined functionality of the communication interface 32 requires execution of a third party application then the module controller 36 and interface 38 will communicate with an external application (CI Thin-Shell) 40 that in turn is used to launch the third party application. This architecture is designed to increase security of the system and provide a consistent interface to external applications regardless of actual method of communication with the third party application. For example, a UNIX™ diskspace command "df" that returns statistics about currently mounted drives in the system takes a number of parameters on a command line, and returns this status information on the external process standard output (stdout). The ACI thin-shell application 40 translates the action to be executed (i.e. "retrieve available space on all drives") into a format that is understood by the third party application (i.e. "df-a" on a Linux™ system).

A communication interface will communicate with other communication interfaces by one of three methods. As stated, the communication interface type field specifies the actual construct/method used. A first method is a network mode wherein the communication interface establishes a number of TCP ports for accepting incoming messages and sending outgoing messages. The particular method by which these ports are utilized is based on system capabilities, current resource levels, and defined parameters. A second method involves a remote process communication mode that allows communication between communication interfaces to be handled using an operating specific construct such as named pipes, shared memory, message queues etc. A third method is an API mode in which the communication interface communicates via shared libraries (DLLs). In all methods there is a separate TCP port that is created and managed for handling discovery of other communication interfaces and control requests from the system. This separate TCP port is under control of a communication interface controller that generally controls all the communication interfaces.

As shown in FIG. 2, the external communication interface 38 of chain communication interface 32 may talk to other communication interfaces that are considered siblings, by virtue of their being in the same chain and having the same controlling interface, of the communication interface. Incoming messages are received from upstream sibling communication interfaces and outgoing messages are sent to downstream sibling communication interfaces. For example in FIG. 22 the CI's CPM, DPM, TPM, and MPM are sibling communication interfaces in the "system control chain" and are controlled by chain module 158.

As shown in FIG. 3, the designation ECI is used to designate a communication interface 43 that serves as the "external communication interface" to a loop or "chain" 44 of communication interfaces 46.

All ECI's are similar in functionality, irrespective of whether they are a component of a (CI) or a chain communication interface.

The module controllers provide specific functionality to the chain to which they are connected. For instance, in FIG. 22, module controllers (MC) designated as PXM, MXM, GXM, CPM, DPM, TPM, MPM, REM, SCM, CVM, IQM, OQM, ACM, IAM, PIM, and NIM each provide a specific functionality to the server system as will be described. In FIG. 22, the communication interfaces (CI, or in the case of this embodiment the ECI) each provide a connection between the server system and a respective module controller, the connection independent of the specific functionality provided by the module controller.

As previously mentioned, and as shown in FIG. 22, communication interfaces are grouped into sets of communication interfaces that may or may not provide similar functionality to the server system, through their respective communication interface modules. Each grouping is referred to as a loop or chain, with a chain communication interface linking communication interfaces (designated as child CI's 46 in FIG. 3) together in a hierarchical manner. This is similar to a sub-network found in a conventional network topology as shown in FIG. 1) with the external chain interfaces 43 providing functionality similar to an intelligent router and the communication channels between the external communication interfaces 46 being analogous to subnets. This configuration serves to limit network traffic by filtering communication messages based on the communication Interface's unique 16-Bit ID, type and family. With this construction, messages are maintained within a domain of an internal chain where appropriate. The communication interfaces (CI and in the case of this embodiment the ECI's) communicate using the proprietary protocol as shown and described for FIG. 4.

Communication interfaces (CI) may communicate with a respective chain in different ways. One way, which may be a default method of communication, is to give to a communication interface a chain segment's IP address and a plurality of ports to communicate with. This method may be overridden so that the communication interface may use a shared object interface such as DSO, DLL or COM instead of the network IP addresses and ports.

Communication interfaces may be serially connected to form communication interface chains (CI Chains) having any number of interfaces, each programmed with its own function. Such chains are shown in FIG. 22, these chains being a data storage chain, a system control chain, a command execution chain, a primary chain, an intelligent agent chain, a message identifier storage chain, a protocol translation chain and a command verification chain. These chains are shown by way of example only, with many other types of chains with different functionalities being possible. In addition, these chains may be nested to a depth limited only by available operating system and/or network resources. Further yet, chains may be divided into chain segments. These segments may exist on either a specific IP address or use a specific mode of communication, such as network, RPC or shared API. With this structure, a communication interface chain may cross machine boundaries, allowing for distributed processing across multiple machines and platforms. When chain segments cross machine boundaries communication is handled by communication interfaces that take incoming messages from a local chain and transmit the message to a destination communication interface, which in turn moves the message to it's local chain segment and vice versa.

In a typically configured server system configuration, and again referring to FIG. 22, chains that are configured include the "system control chain" that contains the communication interface modules that control the system, the "data and code storage chain" that contains the communication interface modules that interface to the data and code storage (where actual messages are stored) as well as the matrix controller, the "protocol translation chain" that handles conversion to and from supported external protocols (such as HTTP, FTP, and proprietary protocols), the "message identifier storage chain" that contain communication interface modules that store message identifiers for requests from the client and message identifiers for responses from the server system, the "command verification chain" that contains communication interface modules that are used to verify requests from clients, the "command execution chain" that contains communication interface modules that execute the commands from clients, and the "primary chain" that is used to link all chains together.

FIG. 4 illustrates one contemplated proprietary data protocol or communications protocol (CP) of messages that may be used in conjunction with the present invention. Data networked within the system is conventionally packetized and transferred as packets between various chains, components and modules of Applicant's system. As such, messages may be composed of many packets, as should be apparent to one skilled in the art. In these messages, a header H is provided at the front of a packet, with the header providing the information shown in FIG. 4. The version number conventionally specifies the version of the protocol that this message conforms to. The header length specifies the length of the message header, in 4 byte increments (or octets), that vary based on classification of the message as described below.

The message type indicates how the communication interfaces will handle the message. Message types are classified as system and user defined messages. A system message is one that cannot be modified by the user. An example of a system message is a CP_DISCOVER_MESSAGE that is used during system startup, and which serves to identify all communication interfaces in the system. In contrast, a user defined message may be customized by the user to perform user defined functions related to a specific instantiation of the system operated by the user and is recognized only by that user-specific system.

Figure 5:
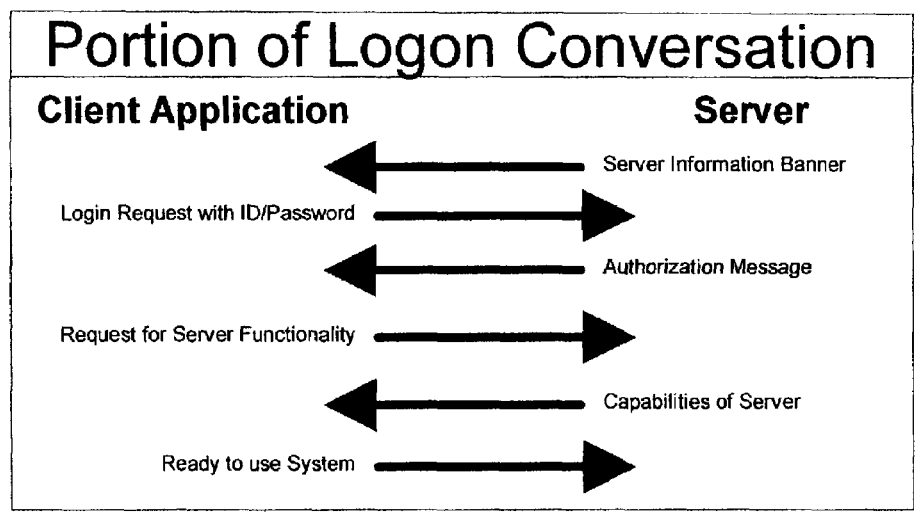
FIG. 5 is an example message flow diagram showing the sequence of messages and responses in a typical logon sequence from a client to the server system.

Each message type may be further classified as either conversational or autonomous, and either routable or non-routable. Here, a single conversational message is one of a plurality of conversational messages making up a single conversation and communicated between the communication interfaces that participate in the transmission and receipt of these conversational messages. A single conversational message implements a part of the task while the conversation as a whole implements the entire task. A conversation ID associates all messages related to that particular conversation. One example of a conversation is when a client logs onto the system. Here, a series of messages are sent in a conversation between the communication interface and the client's machine to authorize the client access and configure the server for that client's session. As such, the messages in a conversation related to the logon sequence will all have the same Conversation ID. As shown in FIG. 5 and in similar diagrams contained herein, each arrow is representative of a message in a logon conversation.

Figure 6:
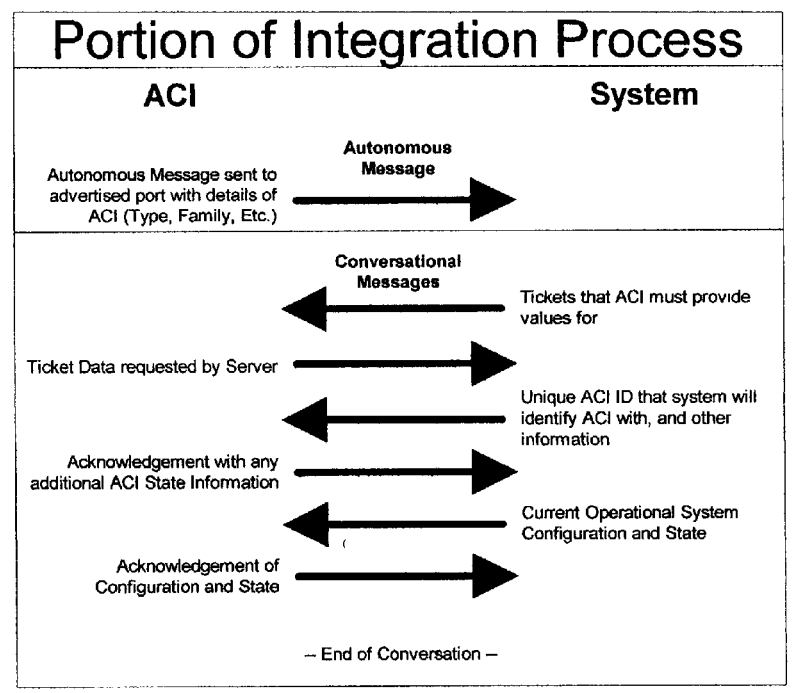
FIG. 6 is an example message flow diagram showing the sequence messages in a typical communication interface integration process.

Autonomous messages, in contrast, are not part of a conversation. Rather, an autonomous message contains the entire content of a task to be performed. One example of an autonomous message is one developed when a communication interface connects to Applicant's system. In this instance, and as shown in FIG. 6, the communication interface first sends an autonomous message to the server requesting that an integration process be initiated in order to integrate the communication interface into the system. In this integration process, the autonomous message from the communication interface initiates a conversation of several conversational messages that are subsequently used to transfer information from the integrating communication interface to the system and vice versa. When the conversation is complete, the communication interface will be fully integrated into the system or an error or warning message generated indicating that there was a problem with the integration of the interface.

Messages types may be additionally designated as routable or non-routable. Routable messages are provided with an address list of addresses to multiple communication interfaces. An example of a routable message is one that distributes addresses of all the communication interfaces within the system. Such a message is sent by a configuration processor module (CPM) to every module in the system that requires such information. As the message is received by each communication interface, the addresses are copied from the address list in the message and stored in an internal address table of the receiving module. The receiving module then routes the message to the next communication interface in the address list until all communication interfaces in the address list have received and processed the message.

In contrast, non-routable messages are addressed to only one communication interface and identified by an ID that is unique amongst the communication interfaces configured and operational within the system. These messages are passed from communication interface to communication interface along the chain until the message reaches its destination. The destination communication interface then processes the message and returns the message with results to the communication interface that initiated the message. As such, only one communication interface processes the non-routable message, although the message may be received and retransmitted by several communication interfaces. One example of such a non-routable message is when the server core requires statistics related to a specific communication interface. Here, the server core sends a non-routable message to the communication interface from which the statistics are being requested. As stated, the message may pass through several communication interfaces along the way, but only the destination communication interface will process the message and return the requested statistics to the server core.

The header box designated "total length" indicates the total length of the message, in octets. With this information, there is no need for a trailer at the end of the message as the length of the message is known by the receiving communication interface after the header portion is received.

Conversational messages include a sequence type and sequence number. The sequence type is a number generated by one of several functions that are typically nonlinear. Here, rather than generating sequential numbers to designate an order that messages are to be processed, as is conventional, Applicant uses these nonlinear functions to generate numbers designating the order in which the messages are to be processed. Such a system adds to security of the system as processing messages out-of-order, i.e. as they are received, would not result in useful data. It would not generally be feasible to determine the correct ordering of the messages unless the function that generated the sequence numbers is known.

Following the sequence number is a block labeled "current source". Data in this box indicates the address of the communication interface that initiated the message. After the current source block is the current destination block, this block containing an ID of the communication interface destined to receive the message. The header of a routable message also contains a destination family and a destination type. Here, the current destination family field contains information that specifies which communication interfaces should process the message based on communication interface family types. These family types are 16-bit values that reference an array in the form of a lookup table where each family type specifies a 512-bit field containing information about the functionality of that communication interface. For example, the communication interfaces that handle client connections belong to the network interface module family. The current destination type field contains information that specifies which communication interfaces are to process the message based on communication interface type. The communication interface type is a 16-bit value that references an array of records where each communication interface type specifies a 512-bit field containing information about characteristics of the communication interface. Each message (either routable or non-routable) must contain enough addressing information to allow the designated communication interface/interfaces to recognize that the message it receives is to be processed. For security purposes, the system will not allow non-routable messages that have an unrecognized identification code to be transferred through any communication interface. This restriction minimizes possibility of malicious attacks on the system, and minimizes unnecessary network and resource usage. If for a routable message, if more than one addressing field contains information the communication interface will determine the message based on the following rules:

DESTINATION ID SPECIFIED: if a destination ID is specified, the communication interface will transmit the message to the chain ACI that is listed as the owner of that destination ID. In this case the destination type and destination family are used only by the receiving communication interface to ensure that it can process the message.

Figure 7:
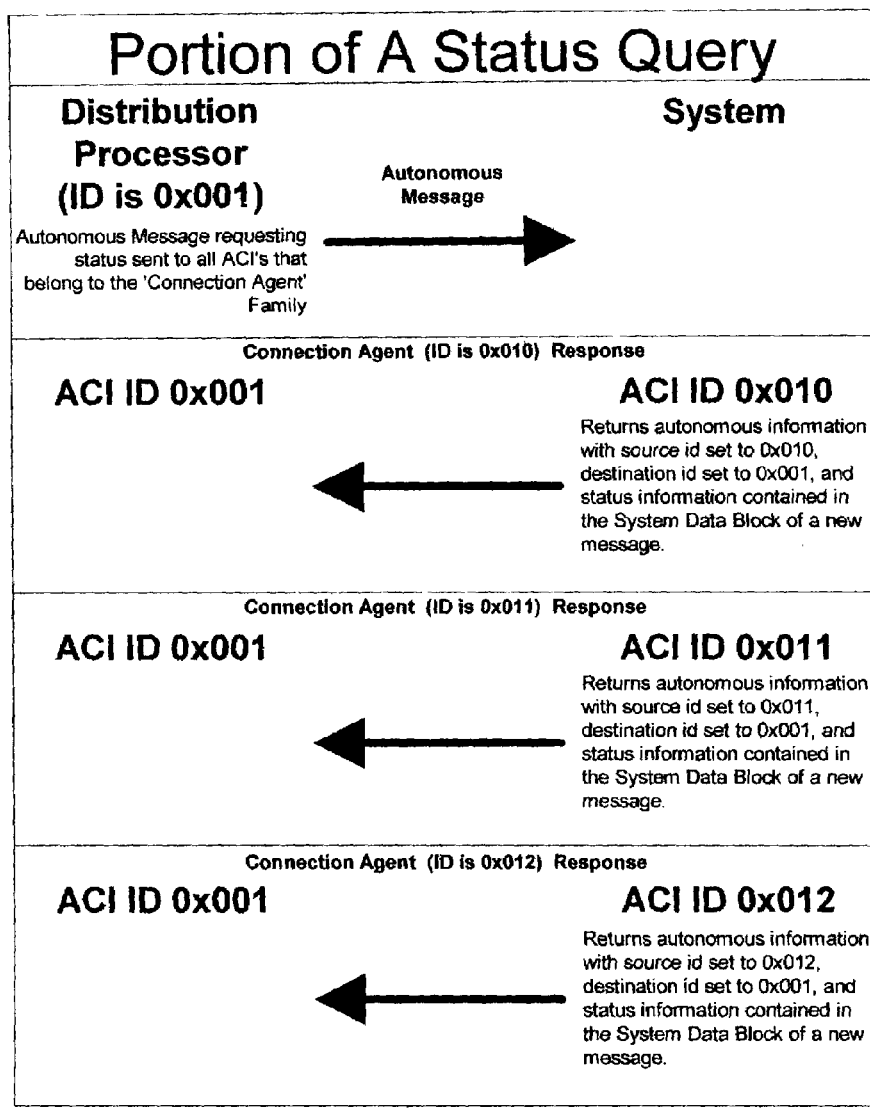
FIG. 7 is an example message flow diagram showing the sequence of messages sent out by the distribution processor and subsequent responses from three communication interfaces.

DESTINATION FAMILY SPECIFIED: if the destination family field contains a 16-Bit Family Type that is authorized for use by the system then all of the communication interfaces in the system with that family type will process the message. In this manner all communication interfaces of a family network interface module may be queried by a communication interface. For example, and as shown in FIG. 7, the distribution processor module in the system control chain (FIG. 22) may query current status of a number of network interface modules with a single autonomous routable message.

DESTINATION TYPE SPECIFIED: if the destination ID and the destination family contain no information then all communication interfaces of the type specified in the destination type field will process the message. In this manner, all communication interfaces that interact with external processes can be queried for status with a single autonomous routable message. If the destination family contains information then this field issues only by the receiving communication interface to insure that it can process the message. In this instance, the initial status request is autonomous, but the responses from the communication interfaces are conversational.

The box Max TTL of the message header shown in FIG. 4 specifies the maximum time to live for a message. In traditional systems, the concept of a TTL is usually found in the underlying protocol that the system uses. Here, packets are only valid for a specific period of time, but the client or server applications must determine whether the information that is transmitted via the underlying protocol's packets is valid (not expired). In Applicants system TTL functionality may be configured by message type. For example, if a client has requested status from a motion sensor that is being monitored by applicant's system and the client considers that a status message is only good for about 30 seconds or so then the system will not deliver 'expired' status messages to the client. This functionality at the message level frees external programs that are connected via communication interfaces from having to deal with expired messages, provides a method for the system to intelligently route messages based on network performance, and can provide a means for establishing message priorities within the system. For example, if a server core is determining the best route for a routable message and there are three communication interfaces that could fulfill the request installed in the system, the server core may use the smoothed roundtrip turnaround time (SMRTT) as should be apparent to one skilled in the art, of the network segments (along with other factors) connecting the three communication interfaces to the server core, and the SMRTT of each communication interface candidate to determine whether the system can fulfill the request within the specified TTL and to choose the one communication interface that can most expediently and efficiently fulfill the request. Additionally, if the server core is routing two messages each having an identical priority, the TTL value may be used to determine which message is routed to the fastest communication interface or which of the two the messages is processed first.

Next in the header block is a series of module block flags that are set whenever the corresponding data associated with that particular flag needs to be acted on. Here, FIG. 4 lists the flags shown in the module block flags portion of the header along with actions associated with these flags.

The address message block A is used for routable messages that have multiple intermediate destinations. The address message block A contains a header that identifies the version of the address message block, a count of the number of intermediate destinations and a sequence number for providing multiple address message blocks in a single message. Each record in the address block contains identifying destination information (ID, Family, or Type code), TTL restrictions for a specific intermediate destination, flags indicating status of the intermediate destination's processing of the message, and timing/statistics information (how long it took to process the request at each intermediate destination)

There is no implicit comparison to traditional systems at this communication level. One analogy to the address message block A may be a routing slip in a library software application where the attached item is to be reviewed by several people and each person must check off his/her name from the list. The communication interface handles the modification of destination identity fields by copying information from the address block to the destination fields, and inserts timing information in the relevant address block record. The insertion of timing information in the address block is definable by message type. If the address block record that caused the communication interface to process the message were identified by type or family then the information would be added in the status block, accumulated in the address block or ignored. This is also defined by message type.

The system of the present invention uses tickets, as shown in ticket message block T of FIG. 4, with a sample ticket format shown in FIG. 8. These tickets may be used to govern client connections, and control access to individual connection interfaces and modules within the system. As shown in FIG. 8, tickets are used to provide security by restricting access to the system, and also contain configuration/reconfiguration data for all levels of the system. At some levels the customer may define what tickets are required, i.e. client/user access. At other levels unavailable to the user tickets are used for licensing control and to minimize likelihood of a customer inadvertently or otherwise breaching security of or disabling the system. Tickets are interpreted by the ticket processor module typically located in the system control chain (FIG. 22). Tickets may be encrypted, in which case everything in the ticket but the ticket header is encrypted using an algorithm specified in the TYPE field of the ticket. The TYPE field may be a 16-bit field that references a 512-bit table entry. The encrypted data is decrypted at least once by a communication interface, and based on the caching directives for that ticket the communication interface stores the ticket ID and a 32-Bit CRC so that on subsequent checks the ticket does not need to be decrypted. Each communication interface that uses an instantiation of a ticket maintains an internal table that has the ticket ID, the current CRC of the ticket data, and when the ticket will expire. When the ticket expires the sender is notified and it is up to the sender to request a new ticket with the same ID. When this occurs the CRC is changed as a result of the sender putting new information in the ticket, signaling the communication interface to decrypt the ticket again.

As shown in FIG. 8, the ticket header, version, ticket ID, ticket type, object ID and CRC are shown. The ticket type is a 512-Bit field that defines the characteristics of the ticket including what it's functionality is, i.e. protect communication interfaces or limit access to the system, whether the ticket is based on a time schedule, such as one valid only during a specific period of time, whether the ticket is dependent on other tickets in the system, and whether the ticket is encrypted. The object ID contains identifying information based on the ticket type. For example, if a ticket is used to limit access to the system, the object ID will contain the use or ID or group ID that can use the ticket. If the ticket is used to limit access to a communication interface then the object ID will contain the communication interface identification number that it is limiting access to. The CRC is a 32-Bit cyclic redundancy check (CRC) to detect whether there have been any modifications to the ticket or if errors in transmission have occurred. If a ticket expires, the user may renew the ticket by entering a new login, password or other method used for ticket renewal.

Figure 12:
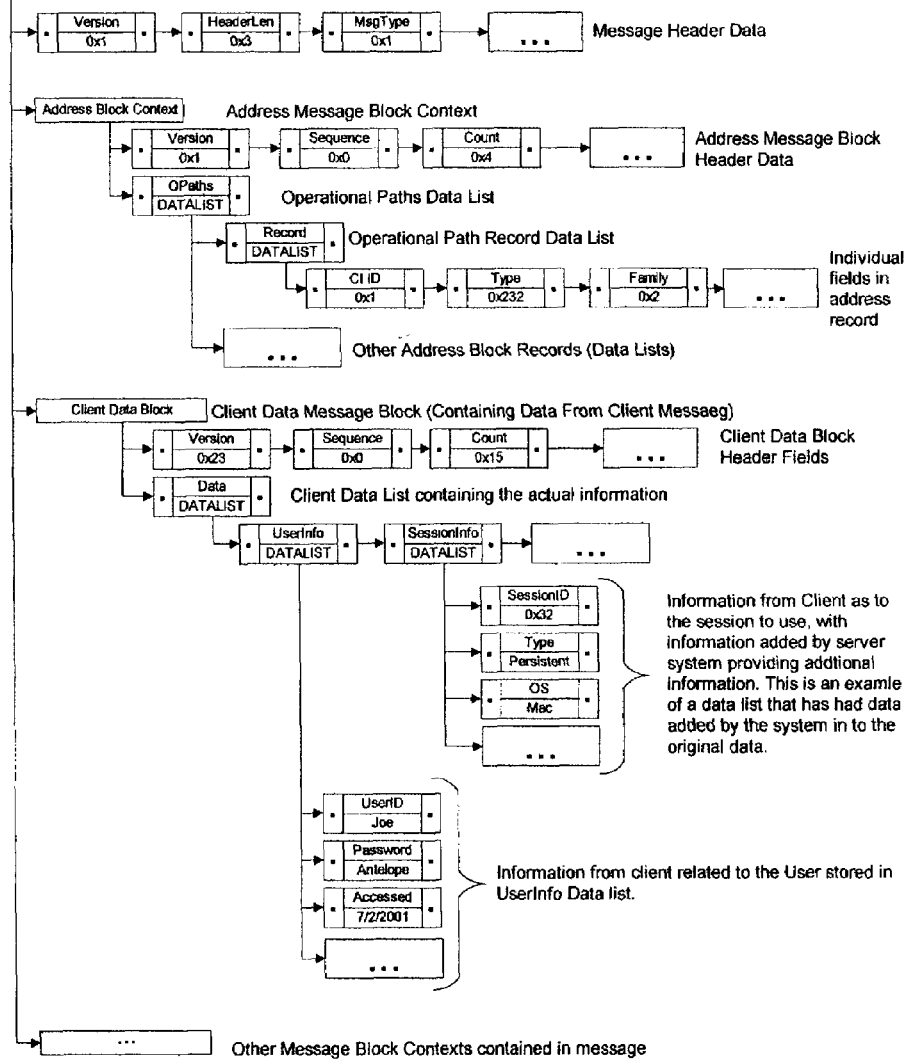
FIG. 12 is an example of a data list and the associated name/value data pairs that contain the information for a typical logon message from a client to the server system.

Below the ticket header is shown a pass phrase ticket block. This block contains data parameters for other blocks in the ticket structure. Tickets are based on some form of authentication, such as user ID, strings from the system bios, a specific time period or date, or existence of other tickets in the system. These are all variables that are applied to rules within the ticket. All variables are stored in the ticket block of the ticket. When a rule within the ticket is run the variables are retrieved from the ticket block. Next is a ticket block, which contains variables that may be used within each ticket block to reference data in other portions of the same ticket, or other tickets. If data is referenced it must be present. For example, if a communication interface is processing a ticket and finds that a ticket with an ID of 0x0032 is referenced by ticket ID number 00x5f, then both tickets must be present in the communication interface. The next box is a security box that places restrictions on objects within the system. This block has a header that specifies the version, number of sub-headers, and the size of the largest sub-header. An access restriction ticket block has one or more sub-headers. Each sub-header has information about the restriction, and is followed by a series of one or more name value pairs, which are data values identified by a unique name as shown in FIG. 12 and that will be described later.

Below the access restrictions ticket block is a validity ticket block that contains one or more conditions that will cause the ticket to expire. These conditions include relative or absolute times, schedules, system state and rules sets. The data associated with each condition is interpreted based on type. A rules set condition is loaded into one of the rule set processors of a communication interface based on the rule set destination (which component of the communication interface is to process the rule set).

Next is a configuration ticket block. This block contains a header, and sub-headers with name/value pairs. Each sub-header and its associated name/value pairs are associated with an object ID and are factored into the configuration process.

The Applicant's server system transfers messages between the communication interfaces integrated into the system using an addressing scheme that consists of identifying each communication interface by a CI's unique 16-Bit ID, the CI's Type, and the CI's family, defining network segments that connect the chain communication interfaces together, and defining lists of these addresses and segments that are described within the applicant's system as 'operational paths'.

There is a minimum of one operational path defined for each proprietary data communication protocol (CP) message. Additional operational paths may be created for efficiency under predictable environmental changes, for example the addition or subtraction of resources, i.e. networks and resources.

FIG. 9 illustrates a sample operational path and possible adjustments made thereto by various server system components. Operational paths are initially assigned to messages received from the client once the message has been translated from the external protocol (i.e. HTTP, FTP, XML, etc.) into the proprietary communication protocol used by the server system. As the message moves through the server system the operational paths may be adjusted by communication interfaces based on segment and communication interface availability, bandwidth, utilization, and processing statistics.

Figure 10:
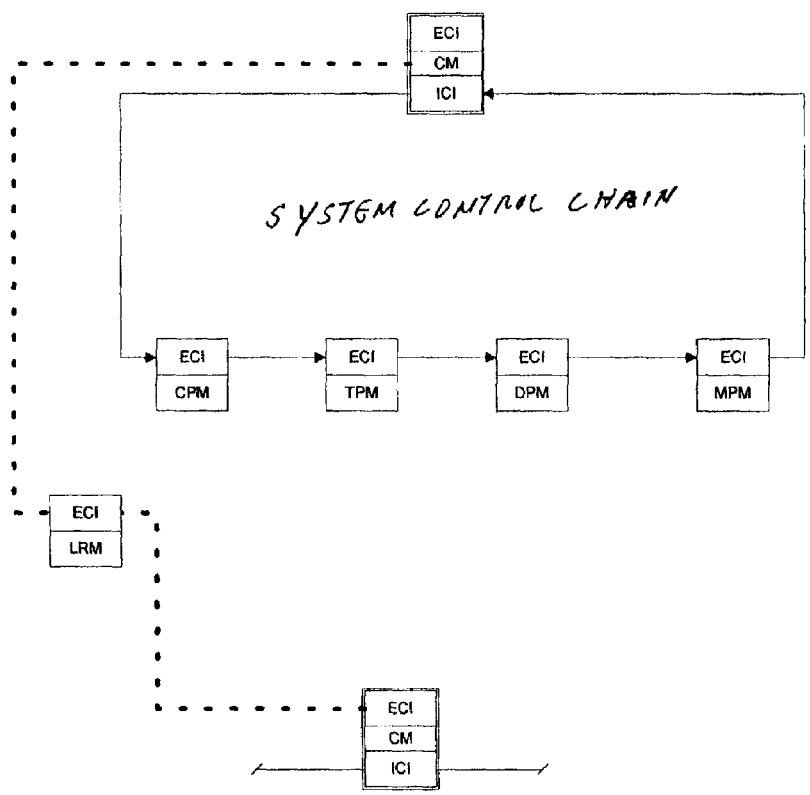
FIG. 10 is a diagram showing the components of the server system that participate in the distribution of addressing information used in the routing of messages.

As shown in FIG. 10, the master lookup table, containing the addresses, statistics, and current status of all communication interfaces in the system, is maintained by a configuration processor module (CPM) that is typically located in the system control chain, and distributed by the distribution processor module (DPM) that is also typically located in the system control chain.

The master lookup table is transferred to all active chain communication interfaces, intelligent agent modules (IAM in FIG. 22), and server core modules (SCM in FIG. 22). Localized route managers, containing a copy of the master lookup table that is periodically updated, may be created and integrated into chains, as needed, to serve as a connector between a chain located on one physical machine and the system control chain that may be located on a different physical machine. If so configured, the local route managers intercept all messages that are destined for the system control Chain and transfer the messages across physical machine boundaries. Likewise, messages containing address list updates sent from the system control chain are transmitted to the local route managers, which in turn transmits the messages to the destination communication interfaces.

Figure 11:
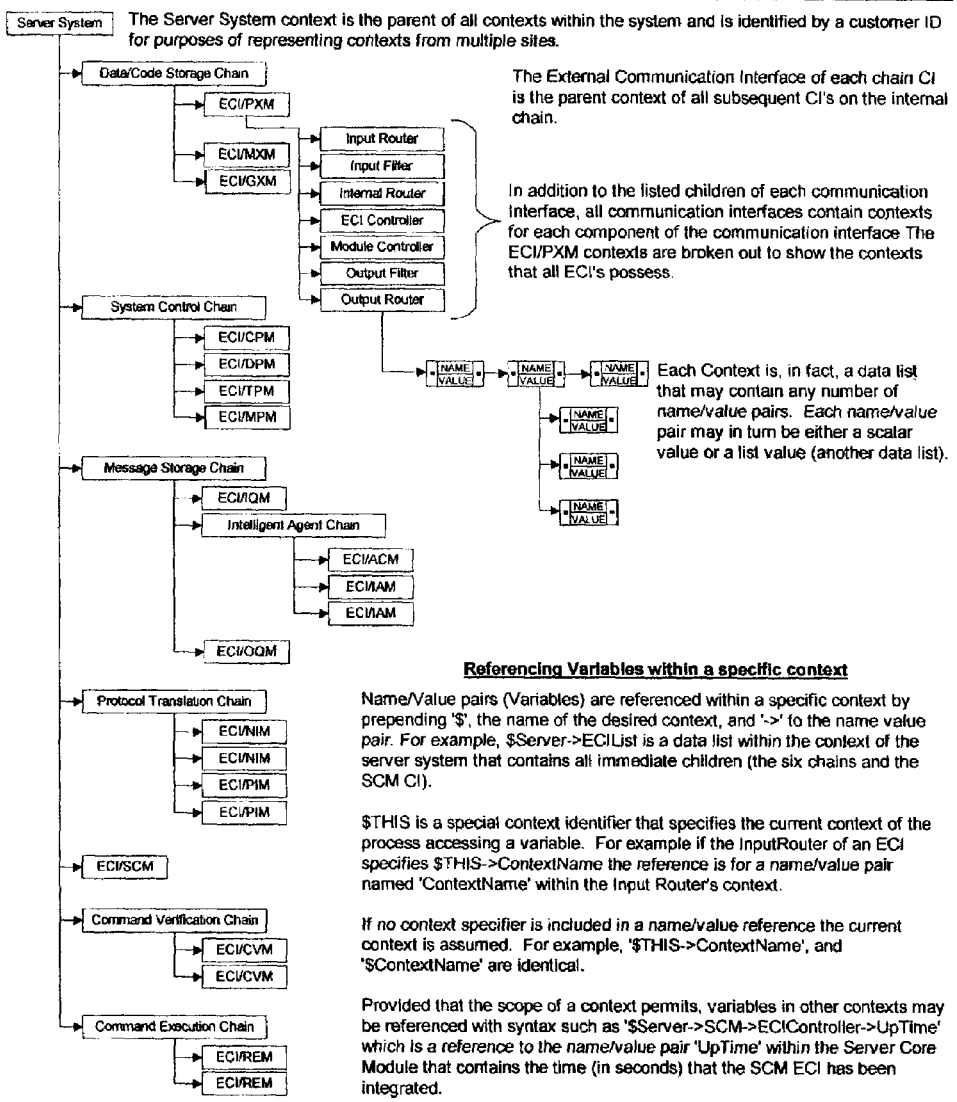
FIG. 11 is a diagram showing an example of hierarchical structure of data contexts within the server system.

As illustrated in FIG. 11, all information related to messages handled by the system, and configuration information, is maintained in name/value data pairs and organized into doubly linked recursive lists. This information is organized into contexts based on where the information is created. Also as shown in FIG. 11, information that is contained within messages (including headers and name/value pairs) are organized into a message context that is further organized by message header, message block header, and message block header data lists.

Information that is contained within the server system (independent of messages) is organized into contexts that are hierarchical in nature and associated with the system, the chain communication interfaces, communication interfaces, and the individual components of a communication interface. The unique ID that is assigned to each communication interface (whether it be an ECI associated with a chain CI, or an ECI associated with a standard CI) is used to identify the context of the data. By way of example, and a shown in FIG. 11, the server system is the parent of all contexts in the system. ECI's that are connected directly to the primary chain are the children of the server system context. ECI's that are connected to these children of the primary chain are, themselves, children of the connected ECI's and descendants of the server system context. This method of association of contexts is applied to all subsequent chains and communication interfaces in the system.

Name/value pairs (variables) are referenced within a specific context by pre-pending '$', the name of the desired context, and '->' to the name value pair. For example, $Server->ECIList is a data list within the context of the server system that contains all immediate children (the six chains and the SCM CI). $THIS is a special context identifier that specifies the current context of the process accessing a variable. For example if the InputRouter of an ECI specifies $THIS->ContextName the reference is for a name/value pair named 'ContextName' within the input router's context.

If no context specifier is included in a name/value reference the current context is assumed. For example, '$THIS->ContextName' and

'$ContextName' are identical.

Provided that the scope of a context permits, variables in other contexts may be referenced with syntax such as $Server->SCM->ECIController->UpTime' which is a reference to the name/value pair

'UpTime' within the server core module that contains the time (in seconds) that the SCM ECI has been integrated.

The name/value data pairs and lists may be referenced by an ASCII name (that is stored in a null-terminated string format), or by a 16-Bit value that is a reference to a lookup table containing null-terminated strings that contain the identification of the name/value pairs. By way of example, the values contained within the name/value pairs are strongly type cast to contain integers, null-terminated strings, Boolean (single bit values), flags (32 or 64-Bit values), compiled regular expressions (conforming to UNIX™ REGEX structures), messages (used to store client requests and responses that are subsequently referenced by name/value pair ID's from the queues and other components of the system), numbers (32 or 64 bit values with real and decimal information), lists of name/value pairs (containing name/value pairs in a contiguous binary format and used for recursive storage of data), time stamps (32 bit values), identifiers (16 and 32-Bit values that contain information such as family ID's, type ID's, etc.), tickets (authentication information contained in contiguous binary format), rules (null terminated string values that are subsequently compiled to binary pseudo-code for use in rule processors and interpreters). The name/value pairs maintained within the PAD are the accessed and stored in such a manner so as to hide the actual method that data is stored. By way of example, data may be stored in dynamic memory, in static local memory, on remote systems or machines, and encrypted or compressed.

Additionally, name/value pairs may be either implicitly or explicitly associated with any communication interface, or other component/module of the server system and assigned a scope that defines the validity of the name/value based on location of the data code in the system, time since creation and/or modification of the data value, or based on a rule-set that is processed on a defined frequency by the component that contains the name/value pair.

Name/value pairs also contain information about access restrictions as well as time stamp information that is used to define the scope of the name/value pairs and to implement a caching scheme that is used to optimize the overall data storage and retrieval scheme.

In FIG. 12 an example of how a data list might be used to represent the information associated with a client named 'Joe' accessing the server system from an application through a network interface module (NIM_1) is shown. The names of the name/value pairs are CI_ID (for communication interface ID), UserInfo (for a data list containing the UserID, password, and last accessed values), SessionInfo (for a data list containing the session information OS, client ID, and sessionID). In this diagram the CI_ID data list is itself in a list, and each of the name/value pairs (UserInfo, SessionInfo, and " . . . ") are data lists that contain information.

Figure 13:
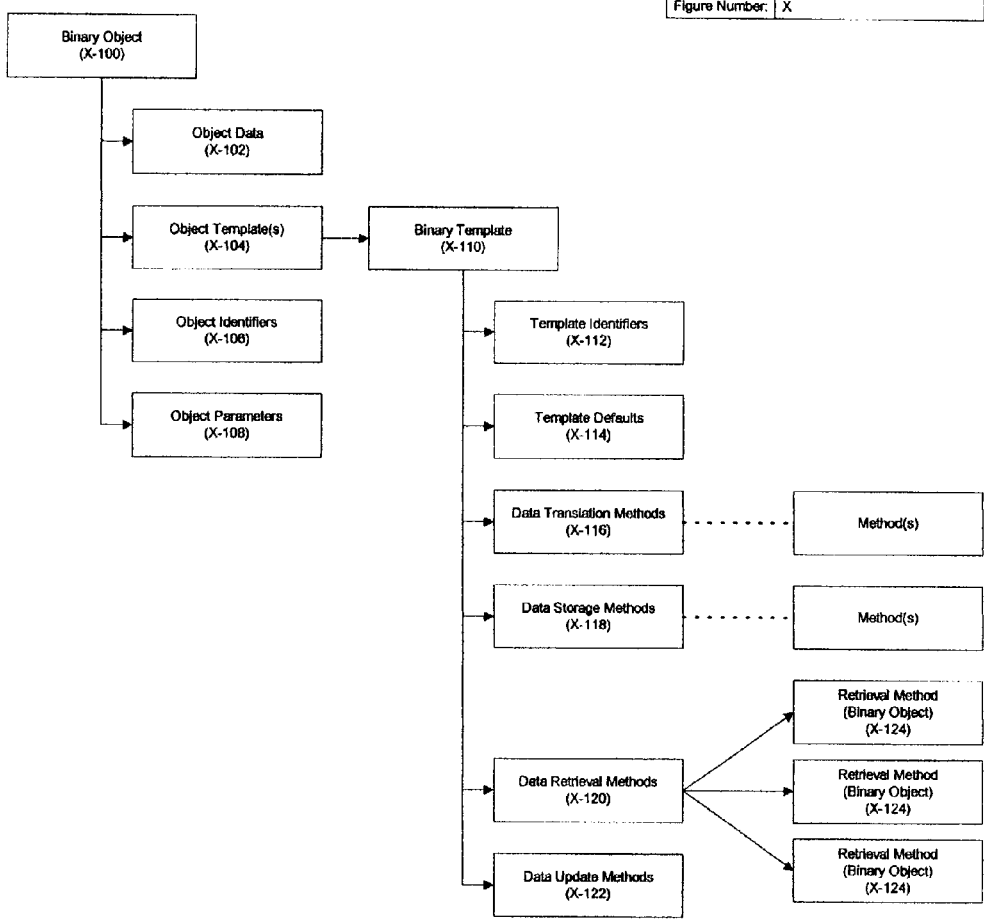
FIG. 13 is a diagram showing the various types of binary objects that are stored within the server system and the method in which these binary objects, that may be one of several types, are presented to the system such that they are handled in a common manner.

Referring now to FIG. 13, binary objects are, for example, compiled rule sets, executable code, and portions of the OSC. Compiled rule sets are created and used to manage the flow of data through the server system. Executable code is loaded into the module controllers of the communication interfaces or executed as external applications from the communication interface. Operational system configuration files are used to initialize the server system during startup and at runtime.

These binary objects are maintained in name/value pairs within the gene pool and are accessed via the gene pool connection module (GXM in FIG. 22. Each binary object is represented by a data list stored in the gene pool. The data list contains name/value pairs that are themselves data lists and name/value pairs. The binary data associated with a binary object is stored in a name/value pair as a collection of binary bits. The binary data is referenced using identifiers that are stored in a data list associated with the binary object. Any number of identifiers may be associated with a binary object. The binary object data list also contains data lists that define binary templates to be used in storing, retrieving, and translating the binary data associated with the binary object. These binary templates, in addition to containing the methods for retrieving, storing, and translating the binary data, also include default identifiers and parameters that are associated with the binary object at the time that the object is inserted in the gene pool.

The storage and retrieval methods associated with a binary template in turn reference methods that are themselves binary objects, specifying name/value pair identifiers of type binary object. Binary objects are retrieved from the gene pool during server system initialization and/or transitional phases, and when communication interfaces are integrated into the system.

Figure 14:
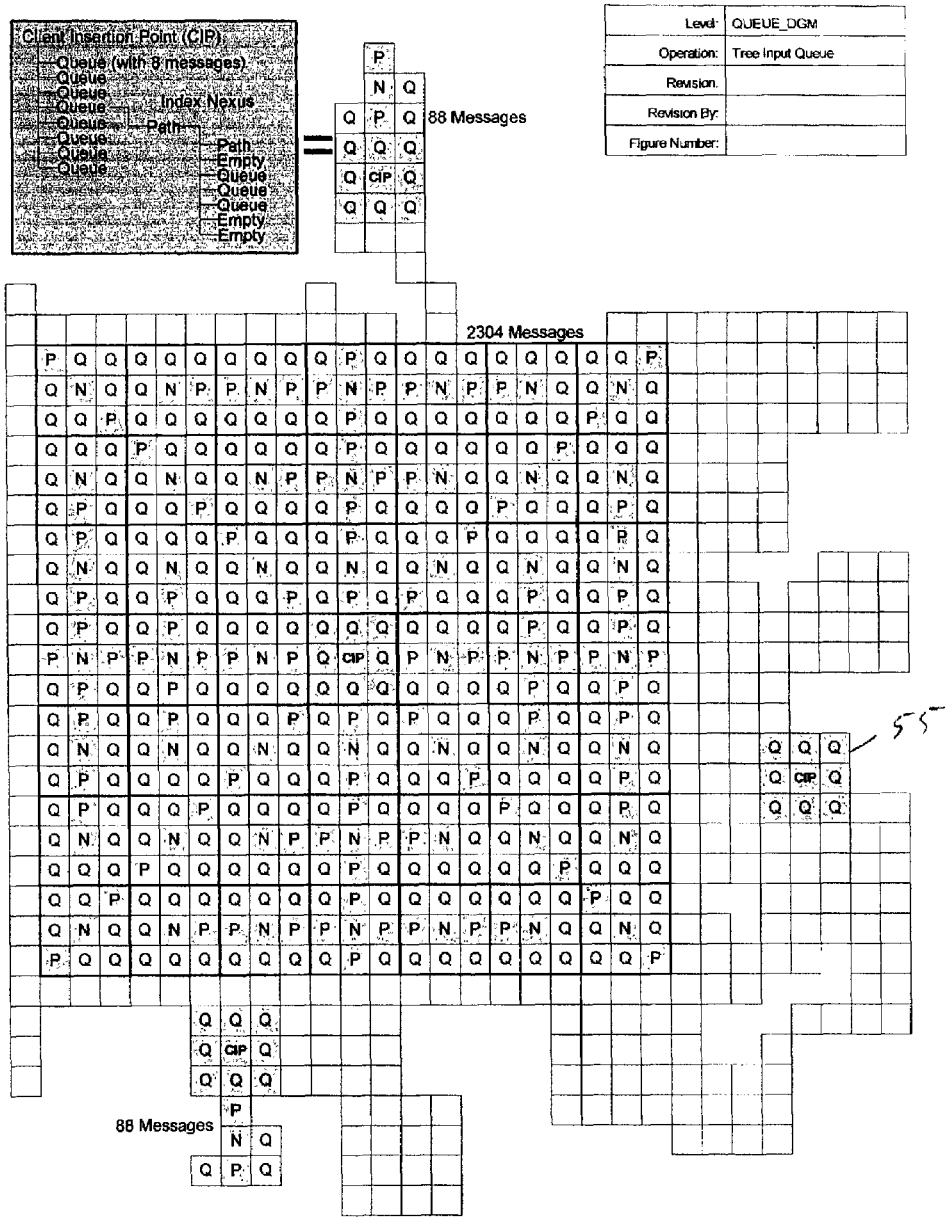
FIG. 14 shows an example of a tree queue that has been created to store messages from four client insertion points that are used by four different network interface modules.

The tree queue, as graphically illustrated in FIG. 14, is a variable number of octally linked data structures, with each member of a data structure being either a nexus that itself contains pointers to up to eight additional octally linked structures, a queue that contains storage for a predetermined number of message Identifiers (that each provide identifiers into the PAD where the messages are stored as name/value pairs, or a path element used to connect two elements together. In other instances, a nexus may be further qualified as a client insertion point that serves as an entry point for message identifiers into the tree queue. Network interface modules receiving messages from the clients and applications connected to the server system store the actual messages in a predetermined location, and insert message identifiers at these client insertion points, after which the inserted message identifiers are selectively distributed and stored within the queue.

As shown in FIG. 14, the entire tree queue is represented as a two (or three) dimensional image map where members of each octally linked structure are represented by a plurality of bytes. This image map is used by intelligent agents that monitor the tree queue for overall system health, retrieve message identifiers for processing by the server system, and watch for potentially malicious attacks.

Figure 15:
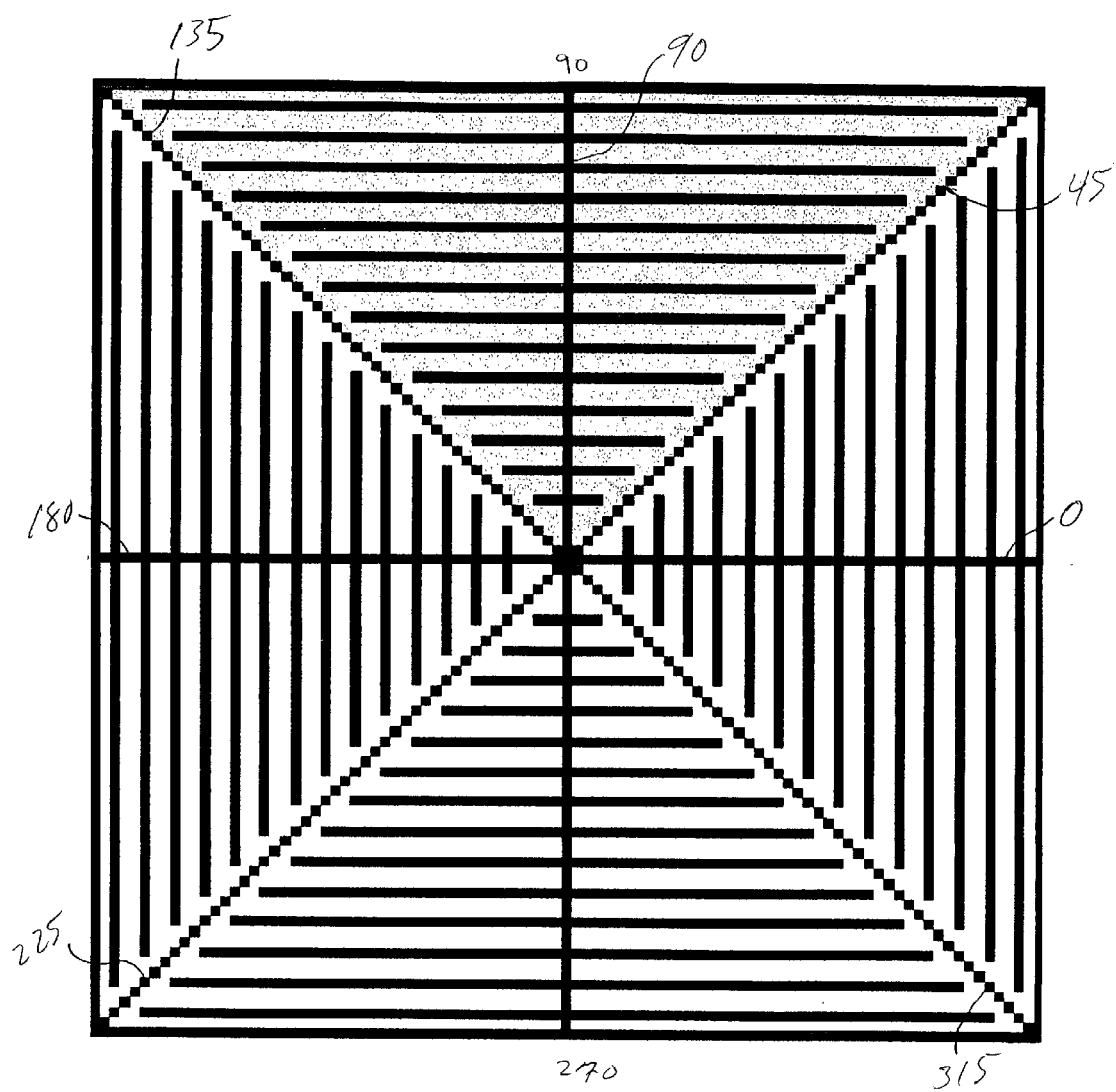
FIG. 15 shows an example of a queue pixel map that is used to represent the elements (nexus, message queues, and paths) of a tree queue. This figure shows an image map that is capable of displaying the status of approximately 2.7 million messages.

In FIG. 15, each pixel of this image map is made up of three bytes that collectively represent a RGB (Red-Green-Blue) color. Each of these pixels is made up of three bytes (24-Bits), and referred to as a queue pixel. When the image is viewed on a monitor the values of the queue pixels result in a color image that is representative of the queue map. Each of these queue pixels represents an element (i.e. nexus, message queue, or path) of the tree queue. These three bytes are further referred to as a primary byte that contains information critical to the specific tree queue element represented (either a message identifier queue, a path, or a nexus), an access byte that contains information related to the last server system component to access that element (i.e. a network interface module, or an intelligent agent with a specific function), and a location byte that contains information related to where the element is located in relation to the element's associated client insertion point, in the tree queue. Priorities may also be assigned, as for instance a trunk 90 may contain priority one messages, and all other trunks contain priority eight messages. The tree queue image of FIG. 15 is representative of a fully allocated queue without any message identifiers stored therein, the queue capable of holding about 2.7 million message identifiers. It should be noted that the trunks are numbered according to their position, with the rightmost trunk being trunk 0 and the other trunks being numbered in accordance with their position in degrees.

The type of element that is represented by a queue pixel determines the association between bytes one, two and three with the primary, access and location byte as well as the bit mapped definition of a specific byte in the queue pixel.

Referring to FIG. 16, the primary, access, and location bytes are bit-mapped to contain information relative to the element of the tree queue (i.e. a message queue, path, or nexus), and functionality of the byte (to contain critical information, access information, or location information). The meaning of these bits are defined in such a manner so as to produce dramatic changes in color on the visual image of the queue map of FIG. 15 when important events occur to the represented queue elements, and produce less dramatic changes in color when events occur or status changes happen that are expected or of little consequence to the overall server system's functionality. Because of this design consideration some of the organization of information in this example may be counter-intuitive. By way of example FIG. 16 defines one way that the bytes may be mapped to information.

The U bit is an urgent bit. This bit is set when there is a problem that must be investigated immediately.

The T bits are type bits. Each byte has a type bit that determines a type of queue element represented by a queue pixel. If the element is a message queue then the T bit in the red byte is set. If the element is a path element then the T bit in the green byte is set. And if the element that is represented by the queue pixel is a nexus then the T bit in the blue byte is set.

The P bits are priority bits. Bits 5, 1, and 0 of the primary byte indicate the priority of the element represented by the queue pixel. Interpretation of this value is based on the type of queue element represented. If the element is a message queue then this value indicates a priority of messages that will be stored in the represented message queue. If the element is a path element then this value indicates a priority of the highest message currently in a queue attached to a descendant of the path element. Lastly, if the element represented by the queue pixel is a nexus then this value indicates a priority of the highest message currently in a queue attached to the nexus.

The V bits are capacity bits. Bits 2, 3 and 4 of the primary byte indicates the current amount of storage or bandwidth currently used in the element represented by the queue pixel. To arrive at a value that will fit in these three bytes the current level of resources is divided by the total capacity of the resources and then multiplied by 8. The interpretation of this value is based on the type of element represented by the queue pixel. For a message identifier queue element this value is derived from the current number of message identifiers in the queue divided by the total number of message identifiers in the queue. For a path element this value is derived from the current number of message identifiers in the queues of all descendant nexii connected to the path. If the element represented by the queue pixel is a nexus then this value is derived from the current number of message identifiers in all attached queues divided by the maximum capacity of all attached queues.

The C bit is the client access bit. This bit indicates that the last server system component to access the element represented by the queue pixel was a process communicating directly with a client or client application.

The A bits are agent type access bits. If bits 0-5 of the access byte contain any value other than 0x0 then the value will contain a type (that identifies an intelligent agent with a specific functionality) and indicate that the last server system component to access the element represented by the queue pixel was an intelligent agent. If the C bit is set then none of the A bits will be set, and vice-versa.

The L bits are location (level) bits. Bits 0-5 and 7 of the location byte identifies the level (relative to the client insertion point) of the queue image map that the queue pixel is located in. If bit 7 is set then bits 5-0 indicate a level from 64 to 191. If bit 7 is not set then bits 5-0 indicate a level from 0 to 63.

For each of the bytes regardless of type or function the sixth bit (the T bit) defines the type of element that the queue pixel represents. Only one of these bits (byte 1:6, byte 2:6, and byte 3:6) will be set at any time in a queue pixel such that if byte 1:6 is set then the queue pixel is for a message identifier queue element, if byte 2:6 is set the queue pixel is for a path in the tree queue, and if byte 3:6 is set the queue pixel represents a nexus in the tree queue.

The access byte indicates the last component/process of the server system to access the tree queue element.

The location byte indicates the level, relative to the client insertion point, that the element represented by the queue pixel, resides on. Levels correspond to tree depth along the horizontal and vertical axis of the tree queue.

The primary, access, and location bytes that make up a queue pixel are arranged such that the resultant image generated by displaying the queue pixels on a screen will present a color image that can be used, similar to a traditional graph, for observing the overall status of the system. For each type of tree queue element represented by the queue pixels the critical factors that might affect overall system performance are located in the defined primary byte for each type. Message identifier queues are assigned a primary byte that makes up the red factor in the RGB queue pixel, because they are the most critical component of the tree queue, and will be the element to most likely cause problems, such as congestion within the system. As the level of messages in a message identifier queue element increases, bits 2,3 and 4 of the primary byte will increase, thus increasing the red component of the queue pixel. Because the priority byte of the message queue is split between bits 6, 0, and 1, the red factor will be greater if congestion occurs in queues containing message identifiers of a higher priority. Paths are assigned a primary byte that makes up the green component in the RGB queue pixel because the priority value held in the primary byte contains the priority of the highest message identifier in any of the nexii that are connected by the path to the upper levels of the tree queue. Because of this, if a message identifier of a high priority is inserted in the tree queue the paths that connect the client insertion point to the node containing the higher priority message identifier will be assigned a higher priority and will be displayed as a brighter green line on the image map. Queue pixels that reference nexii are assigned a primary byte of blue because significance with respect to the overall server system health is less than either the message identifier queues or path elements represented in the image map.

As stated previously there are two purposes in using an image map to represent the elements in the tree queue. An image map allows system administrators to observe the overall status of the server system by looking at a color graphical representation of the tree queues. This provides an intuitive interface to large volumes of information. For example, assuming that each message identifier queue in a tree queue can hold eight message identifiers, an image map that is 603×603 pixels (approximately a six inch square on a 17" monitor) will provide status for the last 1,968,288 message identifiers that entered the server system from client applications. The second purpose is for integration with intelligent agents. Intelligent agents, as defined by the applicant, are processes that although are controlled by the server system, operate as autonomous programs communicating with the server system through communication interfaces as defined previously.

These intelligent agents operate by taking periodic snapshots of the tree queue image map and storing these images in either dynamic or static memory. Image processing routines are then used on these snapshots to monitor changes in the tree queue. By way of example, one such intelligent agent takes snapshots of the image map (or region of map that the intelligent agent is monitoring) on a predetermined frequency, filters out the red and blue components of the RGB queue pixels and finds the most intense areas of green. Because bit 7 of the access byte for a queue pixel representing a message queue is set whenever a network interface module inserts a message identifier in a queue the green component of the queue pixel will be set to 0xFE (127), which is a brilliant green. When the intelligent agent finds a brilliant green queue pixel in the image map it will retrieve the message identifier associated with that queue pixel and pass the message identifier to the server system for processing. Additionally, several intelligent agents with the same functionality may exist, with each intelligent agent being assigned a portion of the image map to monitor. Furthermore, each intelligent agent may be configured to send message identifiers to specific server cores in the system. In this manner the image map serves as one of the primary components for distributive processing within the server system. As system load increases more intelligent agents can be created to handle message identifier and respective message processing. As system load decreases, intelligent agents can be shutdown (or idled). And because the intelligent agents communicate with the system via communication interfaces that are serially linked, the server system does not need to know how many intelligent agents are running in order to communicate with all of them (messages would be broadcast to all communication interfaces of family INTELLIGENT_AGENT). All intelligent agents interact with the queue image map in the same manner, by taking periodic snapshots of the image and performing operations on those images or the differences between the various snapshots. Intelligent agents differ in what changes they are programmed to look for, and what actions to take based on the observed changes in the image map. This programming is accomplished using a set of rules that specify the filters to apply to the images, the colors to look for, and the operations to perform on the elements that changes are found in. Additionally, because information within the tree queue is represented with images, one implementation of Applicant's system might be to store the image maps in the memory of graphics adapters to take advantage of the inexpensive yet powerful processors found on these cards. For example, the Matrox G450 AGP card (that currently sells for $109) contains 32 mb of ram, a 360 Mhz processor and a 256-bit dual bus architecture that is optimized specifically for image processing.

FIG. 14 illustrates one example of a tree queue. As shown, the queue may be a memory mapped structure, with each box representing a plurality of memory cells within which up to 8 message identifiers may be stored. Entry points (client insertion points) within the tree queue are initially determined during server system startup by intelligent agents. These entry points are distributed throughout the memory map in such a way as to ensure that as messages are inserted into the queue that each tree of queue elements has sufficient room to expand given historical data of previous server system sessions and parameters specified in the configuration files for the server system. Once a decision is made as to where an entry point will be, an initial collection of queue elements (i.e. nexus, paths, and memory queues) are allocated and associated with the entry point, as shown in FIG. 14. The entry point (client insertion point) is surrounded by eight message identifier queues. As with all tree queue elements these eight queues are linked to the closest nexus structure that in this case is the client insertion point. Next, path elements are linked to each of the eight message identifier queues surrounding the entry point. The image map associated with a tree queue is then updated to include queue pixels that are associated with the newly created elements in the queue. Surrounding the insertion point at 8 locations are queues, each configured for storing up to 8 message identifiers. These eight queues exist in "Level 0" of the tree queue associated with the client insertion point. Progressing outwardly, each queue is connected to a path statement, designated P. These eight path elements form the bases of eight trunks that are named according to the direction radiating out from the central CIP.

Figure 14A:
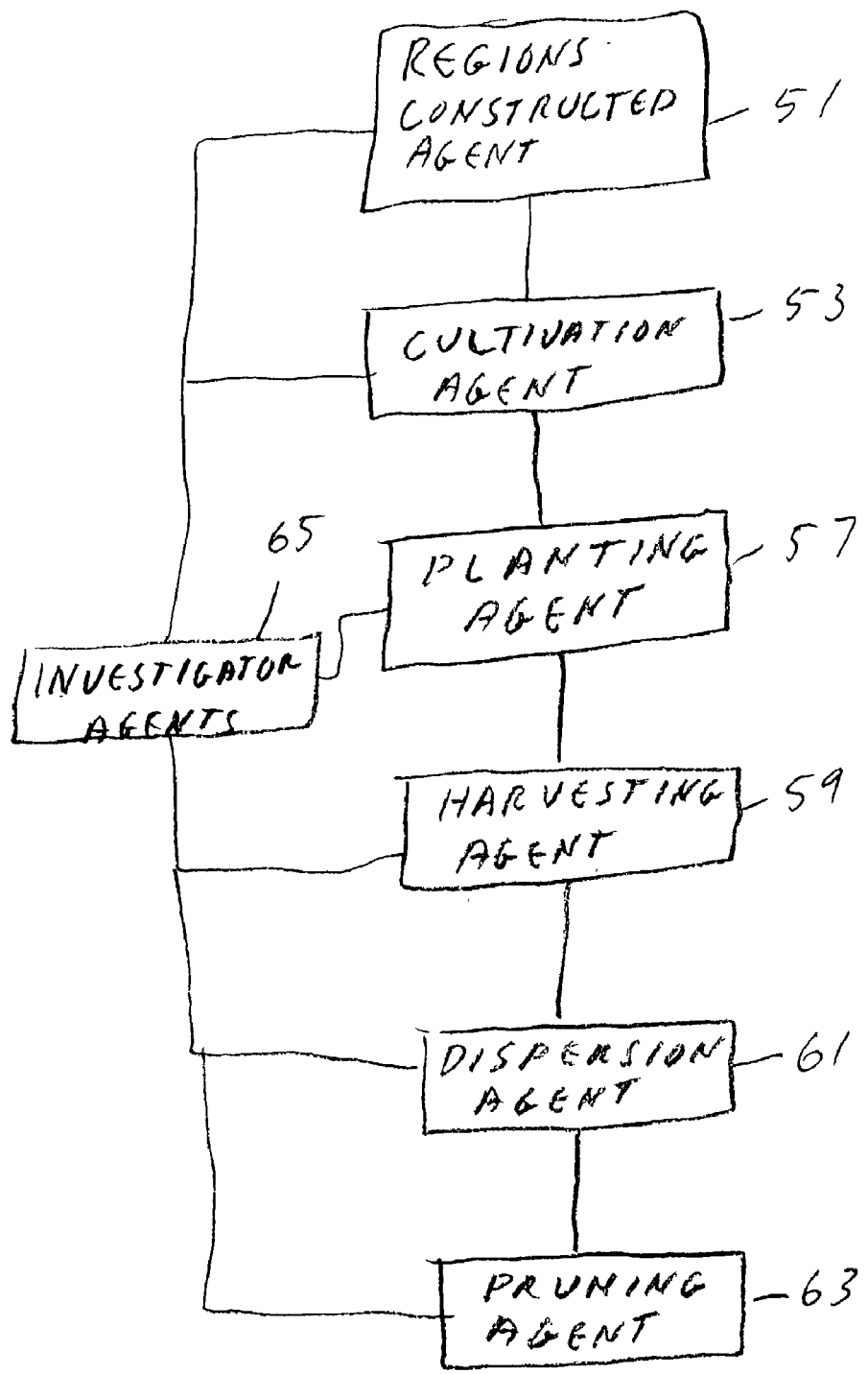
FIG. 14a is a block diagram showing integration of various agents of the system with the tree queue.

FIG. 14a shows 7 classes of intelligent agents. At box 51 and intelligent agent labeled "regions constructed" allocates memory for a region in the tree queue. At box 53 a "cultivation agent" provides a type of formatting wherein the allocated memory is provided with particular regions of memory structured as shown by box 55 in FIG. 14. In addition, the cultivation agents have integrated therein an association process, such as a lookup table, wherein associations are made between the tree queue and a more traditional queuing system, such as a module 50a of FIG. 22. Here, module 50a serves as a temporary storage for the message until it gets put in the tree queue 51 by the planting agent at box 57 (FIG. 14 a). For retrieving the message, (box 59) the harvesting agent retrieves the message from the tree queue and provides it to a second, more traditional storage 59a (FIG. 22) where it is provided to the server core module. With respect to box 61 labeled "dispersion agent", this agent generally evenly distributes messages throughout the tree queue storage area according to a predefined structure, which may be shapes, as shown in FIG. 14, which shows messages being stored in simple rectilinear branch structures. Any shape or pattern may be used by the dispersion agents, and may be images, logos, or any other shape, pattern or image. These shapes or patterns might also be customer-defined. Such shapes allow for relatively easy data analysis, as will be further explained. Pruning agents, at box 63, clear unused or completed messages from regions of the tree queue assigned to a particular pruning agent. In some instances, a message type such as an alarm that has not been picked up, the unused messages are logged. In other instances, a message such as a periodic task (diskspace reporting) that an administrator may only occasionally retrieve is simply discarded if not retrieved. Such discarding of messages may be in accordance with a time to live (TTL) of a particular message type. Investigator agents (box 65 of FIG. 14a) monitor operation of the other agents to ensure proper and efficient operation. Here, a number of agents loaded is monitored to generally distribute workload among all active agents. Also, if an agent becomes stuck in a race or endless loop, the investigator agent reinitializes or restarts the stuck agent. Further, the investigator agent transfers statistical information to other components of the system, such as the matrix controller.

Referring now to FIG. 17, each trunk is comprised of a number of branch levels that are adjusted as needed by intelligent agents in response to anticipated or actual traffic from the client(s) associated with the CIP. Each level of a trunk contains a cluster (a collection of queue elements consisting of a nexus, two to four path elements, and four to six message identifier queues) and possibly one or more clusters identified as branch segments, and possibly two clusters identified as branch terminus clusters. Each branch is further identified as either an ascending branch segment or a descending branch segment (determined based on the direction of the segment with respect to the trunk).

The process of inserting a message identifier on the tree queue is that intelligent agents periodically travel the tree queue associated with a CIP and gather message identifiers to clusters that contain available slots for storage of message identifiers. When a message identifier is passed to the input queue module, the message identifier is inserted in one of the available slots gathered by the intelligent agent and a transaction event is created to modify the contents of the image map based on the message identifier storage process. Message identifiers are stored in slots or directly in the tree queue based on a priority level that is assigned to each trunk of the tree queue and the priority level of the incoming message. This priority level may be a value that is assigned to the message type (during the server system configuration), may be a priority that is derived based on rules that are also defined during configuration, or may be a priority that is derived based on the current system load and architecture of the tree queue image. An example of priority being derived based on the queue image architecture would be, for example, if a CIP and it's associated trunks were created within a specific region of the queue image map that was later expanded into by another CIP (with trunks). The queue may then be limited from growing along specified trunks by setting the priority on the message identifier queues along the limited trunk to a higher priority than found on other trunks. As a typical rule message identifiers are inserted into the queue in such a manner that the queues located on the lower levels of the trunk are filled before the queues on the higher levels of the trunks are filled. This typical manner of filling the queues is modified by altering the available slot gathering process of the intelligent agents using rule based instructions. In the event that previously allocated trunk levels are filled, intelligent agents will allocate (in advance) additional storage space by increasing (growing) the number of levels within the trunks associated with a CIP. A need to increase the number of levels might be an indication of a malicious attack on the system, or a malfunctioning system component. So in conjunction with growing the levels, the intelligent agent(s) may launch additional intelligent agents to perform diagnostics on the system and interrogate incoming messages looking for abnormalities. These abnormalities might include (for example) a client that is transmitting messages every $1/10^{th}$ of a second that normally should only be generated once every few minutes (as in the case of a client email application sending 50,000 mail messages as a result of a denial of service attack due to a virus infection.

The process of retrieving a message identifier from the tree queue is that the server core component of the server system sends a request to the intelligent agent(s) for a new message. Asynchronously to this request, the intelligent agents are looking for changes in the queue image map and storing a list of new message identifiers. When the server core requests a message the intelligent agents will either transfer the message identifier maintained within the intelligent agent's memory or will traverse the tree queues associated with the CIPs to find the message identifier to return to the server core.

Referring to FIG. 18, several state diagrams are shown by way of example to illustrate operation of a typical system configuration. Here, each arrow represents a transition from one state to another, and is governed by a "trigger rule set" that approves the transition. The trigger rule set exists within the state initiating the transition, and the transitional rule set exists within the state being transitioned to. The server system is configured using operational system configurations that are referred to as OSC. Multiple OSC's may be defined in an installed server system but only one operational system configuration will be used at any specific time. Operational system configurations are further subdivided into operational system configuration states (or OSC States). These states represent the current environment of the overall server system and may include (for example) a 'startup state', an 'initialization state', a 'nominal run state', a 'synchronization state', a 'transitional state', and a 'shutdown state'. Users of the server system may define additional states that are configured based on site needs, but are restricted from removing the aforementioned states. The server system typically will only communicate with external clients and devices during the nominal run state and any states that are defined by the customer. Furthermore, run states may specify a level of activity that is performed by each communication interface, but may not change the level of security or the definition of message types for use by the server system (the level of security and message type definitions may only be configured within the overall operational system configuration and remains in effect for the entire time that the defined operational system configuration is active).

The 'startup state' is entered initially when the server system is started up. During this state, the server system performs diagnostics on the machine(s) that the system is installed on and verifies license configuration information. From the startup state, the system transitions to the 'initialization state'. During the initialization state the server system performs discovery, integration, and configuration of communication interfaces and modules as specified in the OSC. From the initialization state, the system transitions to a run state that is configured by the customer based on the current conditions of the environment including available system resources, client load forecasts, and licensing restrictions.

As previously mentioned, the customer may configure multiple run states. These run states are configured with the communication interfaces that will be operational during the state, the rule sets that are active in the communication interfaces, the types of messages that may be transmitted between the communication interfaces, and the level and frequency of diagnostics that each communication interface will perform.

All communication interfaces and modules of the system conform to the currently defined operational system configuration and OSC state, by design and implementation. Additionally, all communication interfaces are capable of providing information to the server system as to the current operating parameters of the CI, and are capable of modifying their operating environment based on requests from the server system.

Operational system configurations are created using an external application that communicates via the configuration processor module (shown as CPM on FIG. 22) with the server system to store configuration files in the process application data storage (shown as PXM in FIG. 22) and the gene pool storage (the connection to which is shown as GXM in FIG. 22). The external application creates operational system configurations using a text-based editor and compiler that creates binary objects representing the configuration information. During operation of the server system, the CPM monitors the current server system environment for predefined transition conditions and uses the distribution processor module (DPM in FIG. 22.) to distribute requests to alter the operating environments of communication interfaces in response to these transitional conditions. By way of example, a predefined transition condition might be defined as client load increasing by 200% within a 10 minute period, with the action to this condition being that the server system should launch an additional 10 communication interfaces to handle the increased client traffic (use of the system). Another example might be defined as a series of communication interfaces becoming inoperable (this would indicate that the machine that the CI's were running on had failed or lost communication with the server system in this example). By convention, system components may transition between OSC states with neither direction from nor communication with human operators or external applications. Also by convention, the system itself will not transition between OSCs without either direction from or notification to external applications or human operators. By design and implementation, all components in the system will transition together and no state is considered fully set until all components have transitioned. Because of the aforementioned conventions, the system site is allowed to choose on its own a preference for OSC states and configurations and whether or not permission to transition to a different OSC straight or configuration is required from a human operator. This general theory is that a technology as distributed as the system is not suited for manual configuration (past initial setup). For this reason I define operational system configurations that are essentially macro-configurations (or guidelines) within which a system should operate. For example in a typical small corporate network there may be one firewall, a file server, a public web server, several workstations, a standby firewall, and an alternate file server. The normal operation of this intranet would be that the standby firewall and alternate file server were kept up to date as far as configuration information and files are concerned, but there is no direct usage of these systems. This would be classified as a "normal operations" OSC.

In the event that a failure occurred in either the firewall or the primary file server the Intranet would need to be modified such that all machines rerouted network traffic through the firewall and accessed the standby file server for data. This special condition would be classified as a separate OSC (i.e. "down firewall OSC", or "failed file server OSC").

Because the changes between these two modes of operation require foreknowledge (as to what machines are available, are physically connected to an alternate network path, or preferred for use in the case of an emergency) manual definition is required to lay out the specifications as to what an OSC is.

However, knowing when a machine has failed does not require manual intervention. Knowing when a machine, or a specific network path, is about to become overloaded or congested requires that there be some network of components monitoring key points in a network (i.e. the total bandwidth usage on the DSL line connecting the office). And having historical information about past performance can also be used to predict when a path might become congested.

Components of the system can switch the entire intranet to a new OSC once it is determined that specific events have occurred (i.e. the firewall goes down), in the process automatically modifying all workstations with updated gateway configurations, and shutting down the systems that are affected.

There are also more normal variances in resource usage that occur during a regular day. For example between 10 am and 2 pm customers may access the public website more frequently than between the hours of 2 am and 4 am. These variances do not require drastic modifications to the intranet, however there are changes that may need to be performed.

For example the frequency and magnitude of mail transfers may be slowed and queued for later delivery.

These type of modifications are known as OSC state changes, and may (based upon the type of modification needed) be made either by individual components of the NES or by system components changing other components.

The key point is that any one time, there is a known operational system configuration in a known state governing the network.

Not only can machines (like firewalls, workstations, etc.,) be modified as a result of OSC, or OSC State, changes, but the individual components and sub-systems of the system may also be configured to respond to different states. For example if network traffic is particularly heavy then the system should not perform as much analysis of resources as it would during a time of low usage (the more analysis, the more load on the system). All components of the system, therefore, have configurable levels of reporting.

Another closely related topic to machines going down, is when new machines are added to a network. Within a traditional environment the period between the time in which a machine is added to the network and it is properly configured there is a high risk of workflow impedance.

To ensure that the licensing restrictions placed on a specific site's configuration are enforced the monitoring processor module (MPM in FIG. 22) constantly monitors the traffic in the server system and ensures that unauthorized use or access to the system is prevented.

As previously mentioned the operational system configuration is created using an external application that interprets a high level text based language to create a compiled version of the operational system configuration file that it is subsequently loaded into the server system.

FIG. 19 describes one example of the steps involved using PERL as the high level language and the steps involved in the compilation and decompilation processes.

In this example, a Perl module (OSCPerl) is distributed with the system. A customer site is given a template perl script file (box Perl script) that when compiled will generate the base configuration file for the site. Modifications are made to the script file (but not the perl module), and the script and module are recompiled at box binary OSC file. The output from this compilation process is a binary object that contains data lists and name/value pairs that are subsequently loaded into the system by the configuration processor module (CPM).

The binary files that are created may be de-compiled (box Perl script decompiler) using another provided external application to produce a file ("flat" Perl script file) that is in the format of a Perl script similar to, but not exactly like, the original Perl script.

By configuration and design, communication interfaces on a specific chain communicate only with other communication interfaces on the same chain (either on the local segment or the remote segment), and the associated chain communication interface. Chain communication interfaces, on the other hand, communicate only with other chain communication interfaces that may not be located on the same chain. So when a communication interface sends a message to another communication interface on a different chain the message is sent first to the chain communication interface that in turn transmits the message to the chain communication interface of the destination communication interface's chain. This process is illustrated further in FIG. 22 (typical server system configuration).

Each communication interface integrated into a network system of the present invention provides some or all of the functionality listed below, with the functionality provided being indicated by the communication's type (CI Type).

Serve as a Communications Protocol Handler

The basic functionality that the communication interface handles is to connect functionality modules to the system. The communication interface extracts message data from the proprietary communications protocol messages. This data is then used by the communication interface and it's associated functionality module. Results from operations of the communication interface and associated functionality module are then translated to a proprietary communications protocol message as described above and sent back to the system by the communication interface.

Monitor and Optionally Maintain System Resources

Part of the communication interface's job is to ensure that the processes associated with the communication interface do not exceed resource limitations as defined by the applicant's system configuration and the physical machine's operating system resource allocations. Additionally, where feasible, it is the communication interface's responsibility to provide any required resources for the processes associated with it. These resources include (but are not limited to) memory and disk space.

Resource Monitoring

The proprietary communication protocol provides for requesting of resource usage by the system and sending of this information by the communication interface. This information may be collected at the time of the request or may be stored in a configurable storage space within the communication interface. Each set of resource usage information includes the date and time that the information was gathered. The communication interface may also store resource usage information gathered from the attached functionality module provided that the functionality module has the ability to respond to status information requests from the communication interface. The level at which a particular communication interface is able to monitor resource usage is indicated by the communication interface's 512-Bit type field that is compiled into the interface. The resource usage level that a particular functionality module is able to respond to, and report on, is made available through a standard API function call from the communication interface's module controller to the functionality module. During the process of resource monitoring, CIs may communicate with or receive data from viral agents residing within other, unrelated processes. The viral agents, which will be discussed hereinafter, utilize idle/reserved resources belonging to other processes in order to reduce operating system overhead associated with start-up or shutdown that would otherwise normally be experienced where the viral agents occupy their own process space. Additionally, by putting the viral agents in these other process spaces, more accurate information may be gathered with respect to active applications.

Dynamically Transfer Self to Other Physical or Virtual Machines

Some communication interfaces have the ability to transfer themselves from one physical (or virtual) machine to another. A communication interface will express this ability through the 512-Bit type field that is compiled into the interface. If so expressed the system may send a message to the communication interface in the event it is to be moved. When the communication interface receives this message it will release all resources that it is using on the current physical or virtual machine, and initiate a transfer message to the CI Chain (indicated by the original message from the server). The chain module of the destination CI will transfer all required code and data for the communication interface from the data and code storage mechanisms of the invention (the gene pool, and the process application data (PAD)), start the new communication interface, and pass all configuration information to it. Actual transmission of communication interfaces may be performed using one of three methods, these methods not intended to be limiting. In one method, traditional protocols may be used, such as an FTP protocol. In another method, one system may provide a ruleset and module type and family data to another system that in turn may load an idle CI or initialize a new CI.

Maintain Consumable Resources

Communication Interfaces will minimize the number of system calls for consumable resources by allocating memory, disk space, and other resources (such as semaphores, file handles, etc.) in advance of their use by the interface and it's associated functionality module. This is accomplished using specialized communication interface functions for allocation and management of consumable resources that use pre-allocated pools of memory, disk space, file handles, etc. This functionality of the communication interface is expressed to the system through the 512-Bit type field compiled into the interface. Where practical and feasible, viral agents may pre-allocate resources for use by components of the NES subsystem.

Dynamically Load, Update and Install Functionality Modules

Functionality modules and communication interface module controllers provide the functionality that the communication interface provides to the system. Functionality modules are typically separately compiled executables or libraries that are connected to the communication interface through an application programming interface (API). For third party functionality modules (legacy applications like 'df', 'ps', or 'netstats' for UNIX) the communication interface uses an ACI Thin Shell application that is a standalone application that incorporates the API for communication with the communication interface's module controller, and STDIO (standard input/output) or TELNET for communication with the third party's functionality module. In this manner the applicant's system can integrate with third party applications to provide additional functionality.

Communication interfaces advertise their use of the ACI thin shell using the 512-bit type field compiled into the interface. By way of example, a communication interface may communicate, through an ACI thin shell application to the UNIX disk space (df) command to gather disk statistics that may be subsequently stored in the system and accessed by remote clients. If a functionality module is not connected to a communication interface, then the communication interface module controller will provide the functionality of the communication interface. It is considerably more inefficient for a communication interface module controller to talk to a separate process than it is to have the functionality contained within the module controller itself. This is done in order that efficient use of system resources is maintained. For example, the input queue module in FIG. 22 does not have a separate functionality module that holds the code and data for the stage one queue since there is no logical reason to have a separate standalone application that can be used only by the applicant's system. Communication interface module controllers and functionality modules are either executable binaries or dynamically linked objects (DLL's, DSO, etc.) that are linked in or accessed at startup or time of use. Communication Interfaces advertise the specific type of binary (executable binary, library, etc.) that are used by the communication interface through the 512-Bit type compiled into the interface. These binary objects are stored in the applicant's system's gene pool (GP) that is used to store all binary code used by the system. All configuration and historical information for these objects is stored in Applicant's system's process application data (PAD) using a name/value data storage scheme that organizes data into lists and data codes. The gene pool and the process application Data serves as a single point of storage that is accessed whenever binary objects or data variables are required by a communication interface. Additionally, when updates to the binary objects or data variables are made the updates are stored in the gene pool and process application data, and retrieved by the communication interface either at startup or upon direction from the system (i.e. initialization, reset, or synchronize requests). Communication interfaces express their ability to be dynamically updated using the 512-Bit type that is compiled into the communication interface.

Create, Refresh, and Destroy Functionality Modules

If a communication interface has an associated functionality module, then the communication interface is the owner (as defined by the specific operating system that the communication interface is created for) of the functionality module's processes. As such, the communication interface can signal the process to refresh, or shutdown. This signaling capability is provided at two levels. The first, more flexible, level is through the API provided for accessing functionality modules from the module controller. In this manner the communication interface may make function calls to the functionality module. The second, less flexible but more dependable, level is through the use of system level signals that the module controller can use to initialize, shutdown, or signal refresh to the attached functionality module.

Dynamically Adjust Operating Parameters of Functionality Modules and Module Controllers Module controllers and functionality modules (If functionality modules are attached to the communication interface via the module controller API) are capable of having predefined operating parameters modified by the communication interface controller upon request from the system, via a message sent from the configuration processor module (typically located in the system control chain), in response to real time changes in system resources, or upon a set time schedule maintained by the communication interface. The communication interface expresses this ability through the 512-Bit type that is compiled into the interface. Dynamic configuration of module controllers or functionality modules might not be present if the functionality module is a third party application, or if there is no need for a specific functionality module or module controller to be reconfigured dynamically (either because the binary object already operates at the most efficient level or any changes that might be made would have a negligible effect on the overall system's performance).

Perform Operational Path (Routing) Adjustments

The input/output filters, and communication interface controller of the communication interface can modify the operational path contained within the address message block of the message to redirect messages, find best routes through the system, and perform additional operations. This functionality is predicated on operational path statements having communication interface families and types, or multiple unique communication interface identifications for one or more segment(s) of the operational path associated with a specific message type. In this case the communication interface will resolve the family, type, or multiple choice ID to choose the most reliable, fastest or available communication interface to route the message to. This functionality is also only applicable for routable messages because non-routable messages do not have an address block in the body of the message. For non-routable messages the communication interface may select the best network segment to send the message to, but it cannot send the message to a different communication interface than what is specified in the destination field.

Maintain Status of Communication Interface Modules

Just as the communication interface can maintain status on it's own operation, it can also maintain status on any attached functionality modules. The level of status that can be maintained is based on the functionality of the interface between the communication interface and the functionality module. If full support for the module controller API is available then the module controller can be configured to report status on all facets of the functionality module's operation. If support for the module controller API is not provided then the communication interface's module controller will use operating system kernel/shell routines to maintain status. In this case, the communication interface is configured with the level of status to maintain on the functionality module and the routine(s) used to obtain status. This configuration information is maintained either in the process application data (PAD) or is compiled in the communication interface.

Report Status of Communication Interface and Functionality Modules

All parts of the communication interface report status, such as system resources, etc., to the communication interface controller. The communication interface controller in turn maintains this information and either upon request from the system, or based on a set time/state change transmits the status information to the chain CI (if not a chain CI itself), which in turn reports status to either a local route manager or the configuration processor typically located in the system control chain. If a local route manager is present and receives the message, that message is transmitted by the local route manager to the configuration processor module typically located in the system control chain. The configuration processor and the distribution processor within the route manager chain coordinate the distribution of this status information. Status messages from all communication interfaces in applicant's system are periodically transmitted to the matrix controller connection (MXM in FIG. 22) for off-line analysis and forecasting of resource utilization.

Maintain Timing Statistics

Timing statistics are configurable by message type within the operational system configuration (OSC) and associated OSC states. This configuration is transmitted to the communication interface when the communication interface connects to the system (a process called system integration), preceding previously unexpressed OSC state changes, and upon transitions between OSCs. Based upon the aforementioned statistics gathering configuration the communication interface will maintain timing statistics on operations within the communication interface, like connection (integration) with the system and disconnection (segregation) from the system. The communication interface will also, based on the timing statistics configuration, maintain statistics on the processing time of messages by the input/output routers, input/output filters, internal router, communication interface controller, module controller, and other components of the communication interface. This information includes the roundtrip turnaround time (RTT) through the interface(s), average processing time through each component of the interface, as well as RTT for request/responses sent between the communication interfaces.

Perform Rule Set Filtering on Messages

All parts of the communication interface use rule sets to control how messages are handled and optionally define additional messages that are generated by the individual components of the communication interface. These rule sets are based on message type and are processed by slack-based interpreters contained within the communication interface. These rule sets are comprised of binary objects (rules) that are compiled for specific operating systems/architectures, and name/value pairs that are used as parameters. The individual rules and name/values are then combined in unique sequences to form rule sets. The rule set interpreters take these rule sets and, utilizing an execution stack and several data/dictionary stacks, perform comparison routines on incoming messages. The individual rule set interpreters may pass results from operations performed to other rule set interpreters. This is the manner in which flow of messages is defined within a communication interface by message type. All rules, name/value pairs, and rule sets are stored in the system's gene pool. The gene pool provides the single source from which rules, rule sets, and name/value parameters are distributed, and the single source that is updated when rules are created/modified.

Reconfigure Self Based on System Environment

During communication interface integration, a communication interface expresses it's capabilities and functionality using the 512-Bit type and 512-Bit family that is compiled into the communication interface. Part of the information contained in this data informs the system how the communication interface can be modified for changes to the operational system configuration (OSCs) or OSC state(s). The system uses this information to determine whether configuration requests should be sent to the communication interfaces. Additionally, during system integration, the communication interface will transmit information related to resource utilization, efficiency of operation under certain conditions, effect on the overall system resource usage as a result of load on the communication interface, and estimated performance times. This information is contained in records that are classified by messages per second of a specified average size. Contained in each record is information such as average ratio of responses to messages sent by communication interface, average time that it takes from when the communication interface first receives a message till when the last response for that message is generated, machine (CPU) time and memory resources used, etc.

Protocol Version Support

Unless specified in the 512-Bit type that is compiled into an interface, all communication interfaces are capable of handling the current version of the Applicant's system's proprietary communication protocol. The communication interface expresses the version of the protocol supported using the 512-Bit type that is compiled in the interface. Each message that the communication interface receives contains a version number as the first field in the message. If a communication interface specifies a number higher than or equal to the number contained in the message then the communication interface is capable of at least extracting the data from the message.

Communication Interface Identification

Communication interfaces are given a unique identifier by a chain CI, a 512-bit type and family that is compiled into the interface and either a network address (IP and TCP Port) or shared memory segment ID depending on the communication mode of the interface. The address or shared memory ID may change as the system undergoes system configuration but the unique ID, type, and family does not change once a communication interface has been integrated. This information is maintained by the configuration processor module (typically located in the system control chain) and distributed to local route managers, chain CI's, and certain intelligent agents in the system. Messages may be addressed to communication interfaces using any of these identifiers. Every communication interface is capable of looking at the destination field of the message to determine if the message is to be processed. Additionally every communication interface is capable of changing it's internal unique ID, address or shared memory ID dynamically while in a startup or reset state.

While the above functionalities are explicitly listed above, it should be apparent to one skilled in the art that other functionalities may be added as needed. Here, all that is required to provide additional functionality is for a module containing the additional function (along with an interface) to be added to the chain. Likewise, it should be apparent that communication interfaces and functionality modules may be deleted or distributed to other machines as needed.

As stated, communication interfaces are generally of two types. The simplest type, which connects a module to the primary chain, is shown in FIG. 20. Here, these communication interfaces CI are provided with an input router 102 that have a multiplexed input (or alternately a plurality of inputs) coupled to chain 100. Input router 102 is provided with a set of rules 104 that determine which messages are to be processed by a particular communication interface and its associated process. Input router 102 is coupled to an output router 106 with its associated rules 108, router 106 also being coupled to communications chain 100. Where a message is operated on or processed by a process in a communication interface, the result is applied to chain 100 via the output router 106. If a message is received by the communication interface and input router 102 determines that the message is not to be processed in that communication interface, then the input router simply applies the message to the output router, which in turn applies the message to the communications chain. In network communication mode applying the message to the communication chain means that the communication interface sends the message to the next CI in the chain. In shared memory or IPC/RPC mode this means that the chain module controller is signaled to transfer the message to the designated current destination. Input router 104 is also coupled to an input filter 110 having a set of rules 112 that govern operation of process based on standard means provided by the operating system/architecture.

In addition, internal router 114 is further coupled to a communication interface controller 130. The internal router 114 will apply all messages that are defined as control messages and any messages that are to be stored for later processing to the communication interface controller 130. Communication interface controller 130 is provided with its own set of rules 132, an address manager 134, and a stack manager 136. Address manager 134 stores and maintains a local copy of the communication interfaces that are known to the communication interface.

A chain CI's address manager will contain a list of all communication interfaces in the system. A regular communication interface will store the addresses of all communication interfaces in the same chain. The stack manager 136 maintains the execution stack(s), data stacks, and dictionaries used by the rule set interpreters within the communication interface. This stack manager 136 provides a set of thread-safe functions that are accessed from the various components of the communication interface. Communication interface controller 130 is also coupled to module controller 118 for transfer of control messages from the communication interface controller to the module controller, status information messages between the controllers, and other messages that may be defined and created that affect the operation of the communication interface or the attached functionality module. The communication interface controller 130 is coupled to output filter 138 having a rule set 140. Output filter 138 is in turn coupled to output router 106, and output router 106 is coupled to chain 100. With this construction, a message on chain 100 is received by input router 102 and examined thereby to determine whether the message is to be operated on by that communication interface. If not, then the message is applied directly to output router 106, which applies the message back to chain 100. If the message is for that communication interface, then the message is applied to input filter 110. Input filter 110 determines whether the message should be processed immediately, stored for later execution/processing or rejected based on the current state of the communication interface. Additionally, input filter 110 will determine whether the message type of the examined message specifies that another message must be received before the examined message can be processed. For such an 'inter-message' dependency input filter 110 will apply the message to internal router 114 that will then apply the message to the communication interface controller 130 that will store the message until the required message is received by input filter 110 during subsequent processing. Module controller 118 will begin communication with the attached functionality module, if present, otherwise module controller 118 will process the message based on the controllers declared functionality as defined by the 512-Bit family code compiled into the communication interface. If there is a functionality module 124 attached to module controller 118 then the module controller will handle all communication with module 124 including control requests from communication interface controller 130, status requests from other components of the communication interface, additional messages from the internal router, and responses from the module to the system. Once the declared functionality of the module controller is completed, the module controller will apply the message results to module controller 130 that, based on the configuration for the processed message's type, may generate an acknowledgement, status responses, or simply modify the message with results and apply the message to output filter 138. Filter 138 may modify the message destination and address message block based on rule set 140. Output filter 138 then applies the message to output router 106 that applies the message to the communication interface chain.

The other type of interface, i.e. interfaces 150, 152, 154, 156, 158, 160 and 162 of FIG. 22, are generally constructed as shown in FIG. 21. Here, it is seen that these interfaces are made up of an external chain interface (ECI) 170 coupled to chain 100, an internal chain module (CM) 172 and an internal chain interface (ICI) 174. Internal chain module 172 interfaces the internal chain interface 174 to external chain interface 170 in order for communications to occur between the external chain 100 and an internal chain 101, which includes modules M.

In FIG. 21, identical components to those shown in FIG. 20 are given identical designation numbers along with the suffix "a". As such, in ECI 170 there is an input router 102*a* with its rule set 104*a*, and which is coupled to an input filter 110*a* and associated rule set 112*a*. Filter 110*a* is coupled to router 114*a* and its rule set 116*a*, in turn coupled to CI controller 130*a*. For brevity, not all connections to/from controller 130*a* are shown, as it functions like controller 130 of FIG. 21. Controller 130*a* is coupled to output filter 138*a* and its rule set 140*a*, and is in turn coupled to output router 106*a* and its rule set 108*a*. Operation of external interface 170 is very similar to or identical to operation of the external interface shown in FIG. 20.

Coupled intermediate to the external chain interface and internal chain interface is chain module 172, which generally contains logic that handles transfer of messages between the external and internal chains. Chain module 172 restricts message traffic between communication interfaces located on the internal chain from exiting to the external chain, thus acting as an intelligent router to limit overall network bandwidth utilization and maintains address information for source and destination resolution. Here, a chain module controller 150 is coupled to CI controller 130*a* of external interface 170, and coordinates operation of components within the chain module and coordinates communication between the external and internal chain modules. Also coupled to chain module controller 150 is a chain module statistics handler 152. This handler 152 is a rule-based process for collecting statistics on traffic through chain module 172 and on chain module operation in general. For example, statistics module 152 may count the number of messages passing through chain module 150 and collect statistics such as the duration that a message is maintained in memory. Address resolution cache controller 154 maintains a local list of all communication interfaces in the system. This list is updated by the distribution processor module DPM typically located in the system control chain of FIG. 22 in response to changes in the system that occur through system/interface failures or OSC and OSC state transitions, or on a periodic basis.

This list is used for routing messages to all other known communication interfaces in the server system.

Additionally, the address resolution cache is accessed by other components of the communication interface, via the communication interface controller, for resolving unknown addresses that are received by input router 102*a*.

Filter 110*a* is coupled to router 114*a* and its rule set 116*a*, in turn coupled to ACI controller 130*a*.

For brevity, not all connections to/from controller 130*a* are shown, as it functions like controller 130 of FIG. 20. Controller 130*a* is coupled to output filter 138*a* and its rule set 140*a*, and is in turn coupled to output router 106*a* and its rule set 108*a*. Intermediate to the external chain interface and internal chain interface is the chain module 172, which generally contains logic that handles transfer of messages between the external and internal chains. The chain module restricts message traffic between communication interfaces located on the internal chain from exiting to the external chain thus acting as an intelligent router to limit overall network bandwidth utilization and maintains address information for source and destination resolution. Here, a chain module controller 150 is coupled to the ACI controller 130*a*, the chain module controller coordinating operation of components within the chain module and further coordinates communication between the external and internal chain modules. Also coupled to chain module controller 150 is a chain module statistics handler 152. This logic is a rule-based process for collecting statistics on traffic through the chain module and on chain module operation. For example, the statistics module may count the number of messages passing through the chain module and collect statistics such as the duration that a message is maintained in memory. Address resolution cache controller 154 maintains a local list of all communication interfaces in the system. This list is updated by the distribution processor module (typically located in the system control chain) in response to changes in the system that occur through system/interface failures or OSC and OSC State transitions, or on a periodic basis. This list is used for routing messages to other communication interfaces within the internal chain as well as through the chain module, as in the case of a message created by a communication interface on the internal chain destined for a communication interface that exists on an external chain or in the case of a message that is created on a communication interface, on the internal chain that is destined for another communication interface on the internal chain. Additionally the address resolution cache is accessed by other components of the communication interface, via the communication interface controller, for resolving unknown addresses that are received on input router 102*a*.

The internal chain interface ICI 174 contains components similar to the external chain interface 170. Those components that are similar or alike in function to those components of the external interface are similarly designated and are provided with the suffix "b". Here, there is an output filter 138*b* with its rule set 140*b* coupled to an output of chain module controller 150. This output filter 138*b* receives messages from chain module controller 150, and provides the messages to output router 106*b*. Messages from internal chain 101 are provided to input router 102*b* which routes the messages between output router 106*b* and input filter 110*b*. Messages between communication interfaces on the internal chain are typically applied from input router 102*b* to output router 106*b* unless the message is destined for the chain module, an external communication interface, or the message is addressed in such a way that the input router 102*b* assumes that the message is intended for an external communication interface. In this instance router 102*b* applies the message to input filter 110*b*, which applies the data to chain module controller 150. If the message is intended for a communication interface on the internal chain but is inadvertently applied to chain module controller 150 then the module controller will, in the process of resolving the address find the mistake, modify the destination ID of the message and transmit the message to output router 106*b* via output filter 138*b*.

As shown in FIG. 22, Applicants system is configured as a plurality of communication interfaces and communication interface modules connected in a chain or loop, with communication interfaces being added or deleted as needed, as will be explained.

Referring to FIG. 22, one embodiment of a simple implementation of the present invention is shown. Here, a remote wireless device 130, such as a palm pilot-type device, is coupled via its protocol to the Internet 132. On the opposite side of Internet 132, Applicant's server system is shown in block diagram form, in this instance residing in a single computer 134, as illustrated by dashed lines. In addition, a request execution module (REM) 60 may be coupled to the Internet (shown), a security monitor or any other device that is able to communicate with a computer. The request execution modules may be used, for instance, where a building's security system is being monitored, or in medical applications where sensors are attached to patients or to devices such as I.V. drips and monitored by Applicant's server system. Any other application conducive to external monitoring or control may be interfaced to Applicant's server system using the request execution module.

Each of the modules or components of the server system will now be broadly described. In general, a number of communication interfaces, labeled ECI, ICI and CM, as described for FIG. 21, are shown coupled in a primary serial, or chain, arrangement 100. Other components, such as stage one message identifier queue controller 48 and intelligent agent chain 52, are coupled through their respective communication interfaces 46 and 50 in a sub-chain configuration wherein, for instance, the input queue module 51 is coupled to the subchain via an ECI 50, as shown and described for FIG. 20. Components 48 and 52 are thus able to communicate between themselves without imposing any traffic on primary chain 100. In addition, components such as the server core module (SCM) may be coupled to the primary chain 100 via an ECI, as shown and described for FIG. 20.

As shown, the system is configured in the form of a chain 100, with messages and responses moving generally counterclockwise there around. Initially, the system is coupled to Internet 132 by one of a plurality of network interface modules (NIM) 36 that handle media or protocol transmission (i.e. RS-232, TELNET, HTTP, etc.), which in turn is coupled to an ECI 38. A request made from a client device 130 coupled to internet 132 is thus passed from NIM 36 to ECI 38 which passes the request to protocol interface module (PIM) 40 via its respective ECI. Module 40 translates the format of the request from the client protocol to the proprietary protocol (as described in the foregoing) used in the present invention. Additionally, the protocol interface modules perform authentication specific to the applicant's system and/or defined by the customer. The request from remote device 130 is then passed to communication interface 42, (successively through the ICI, CM and the ECI as described) which passes the request to input queue module communications interface 44. Interface 44 communicates, again successively through its ECI, CM and ICI with ECI 50 coupled to input tree queue manager 51 for storing message identifier's therein as previously described. The ECI 50 communicates with an internal intelligent agent chain 52 via ECI 46, CM 156 and ICI 53, agent chain 52 controlling one or more intelligent agents that are typically installed on the same chain as agent controller module 70. These intelligent agents are used to retrieve message identifiers from stage one queue 51 and monitor overall performance of the system using the proprietary queuing and index schemes of the tree queue as described above. With this construction, messages are translated through the protocol interface module and passed to interface 42 for storage into stage one queue 51 via the communication interface 50, with storage of the message identifier and status of the queue 51 monitored by intelligent agents residing in subchain 52. In the event the system is not configured with a tree queue, such as when the server resides on a personal digital assistant (PDA), the queuing system incorporates a more traditional, procedure-oriented scheme for message queuing in order to greatly reduce overhead, allowing the server to operate on resource-limited platforms. Here, the server may be configured within a memory environment of about 2 or so megabytes of memory.

For executing a request, the server core module 54 requests a message identifier (through its respective ECI) from the agent controller module 70. Here, the request is passed counterclockwise through the respective ECIs for the command verification chain, the command execution chain, the system control chain, the data and code storage chain and the protocol translation chain. When the request reaches the ECI for the message identifier storage chain, the input router 102a thereof (FIG. 21) routes the request through the ECI as described to CM 152 (FIG. 22). From there, the request is passed by the chain module controller 150 (FIG. 21) to ICI 153 (FIG. 22), where ICI 153 passes the request to ECI 50, which in turn routes the request through the intelligent agent interface to the ECI associated with agent controller 70. Controller 70 then determines the communication interface (s) to which the message is to be sent in order to best fulfill the request from the client 130. This list of best communication interfaces is determined using the "message type" parameter of the message to retrieve a list of communication interface candidates from a lookup table. The request then is passed to command verification module chain 56 via the ECIs for the IAMs, ICI 53, CM 156, ECI 46, the ECI for the output queue module (OQM), interface 44 and the ECI for the server core (SCM), the command verification module interrogating the name value pairs in the client request to ensure that all required data values are present, adding any default values that are not present, and resolve any variables contained in the name value pairs. The "command verification chain" module 56 transmits the so-modified message via its interface to the command execution chain" interface that transfers the message to the request execution module (REM) 60 that executes the request contained within the message. The way in which the command is executed may be determined by a server core module, a command verification module, or by an individual request execution module, such that the command may be executed as an externally spawned process, run on a remote machine, or executed within the REM's module controller. The command execution chain stores the response(s) generated from the execution of the request in the results data message block (FIG. 4), any status messages that are to be returned to the client in the status message block of the header, and any information to be used by subsequent communication interfaces in the system data block, as indicated by a system data flag being set in the module block flags. The executed response is passed through the interface to ICI the ECI coupled to chain 100. This ECI passes the response to the ECIs of the system control chain, the data and code storage chain and the protocol translation chain. When the response gets to the ECI for the message storage chain, its input router passes the response upward through the interface to ECI 50 and subsequently to ECI 46 where it is routed therethrough to the ECI for the output queue module (OQM). The ECI for the output queue module passes the request to the output tree queue, where it is stored. The client may then be notified that the response is completed, or the client may periodically request status of the response from the output queue module.

For retrieving messages, the client sends a request to retrieve the message through a respective one of the NIMs 36. This request is passed counterclockwise through the ECIs of the protocol translation chain to interface 42. Interface 42 couples the request to chain 100, where it is passed to message identifier storage interface 44. The ICI of interface 44 passes the request to ECI 50, which in turn communicates with an agent controller module 70 via the intelligent agent chain interface, module 70 controlling one or more intelligent agents (IAM) that are typically installed on the same chain as the agent controller module. Each of these agents are similar in structure and implementation but differ in the tasks that they perform. These tasks are, for example, construction which is the process of allocating the structures for the tree queue or portions of the tree queue, cultivation which is the process of preparing previously prepared structures in the queue for use, planting which is the process of inserting message identifiers in the queue, harvesting which is the process of collecting message identifiers that have been put in the queue, rotation which is the process of determining which portions of the queue will be cultivated, pruning which is the process of removing unused tree queue regions, and investigator which provides for tasks not directly related to the storage and retrieval of messages in the queue. As stated, these intelligent agents are used to retrieve messages from stage one queue 48 and monitor overall performance of the system using the proprietary queuing and index schemes of the tree queue. The agent controller module 70 transmits the request to a one of the intelligent agent (IAMS) responsible for the portion of the queue the message identifier, to be retrieved, is stored in. Prior to receipt of this request the IAM may recognize that a new message identifier was inserted in the OQM and may have sent a request to the PAD, through the "intelligent agent chain interface", the "message identifier storage chain" interface, ECIs for the server core module (SCM), command verification chain, command execution chain, system control chain, to the "data code storage chain" interface's chain module controller. This chain module controller recognizes that the request is for the content of the message identifier and passes the request to the pad connection module (PXM) that in turn communicates with the PAD to extract the content of the message. The content of the message is then transmitted counterclockwise through chain 100 to the intelligent agent (IAM) that requested the content for storage until the client requests the response. Once the intelligent agent receives the request from the client for the message content the intelligent agent inserts some or all of the message content in the request and routes the message to the PIM (through the respective ECIs as described). At this point the PIM extracts the message content from the request and performs translation of that content into the protocol supported by the client. The translated content is stored in a "tunneling message block" of the request and transmitted counterclockwise through the "protocol translation chain" to the NIM connected with the client. The NIM extracts the translated content from the "tunneling message block" of the request, builds the packet formatted to the specifications of the protocol supported by the client and performs all required flow-control and error-correction to transmit this assembled packet to the client.

The "system control chain" 159 is a chain of communication interfaces and command interface modules (as will be described) coupled to chain 100 via a chain module communication interface 158. The system control chain 159 contains a configuration processor (CPM), a ticket processor (TPM), a distribution processor module (DPM), and a monitoring processor module (MPM) that ensures licensing restrictions are not violated by observing messages passed through the system control chain destined for or received from communication interfaces that are not authorized for operation.

These processors generally control overall operation of the system. The matrix MXM, connected via matrix connection module 82, coupled to chain 100 via a chain communication interface 162, may be implemented as a neural net, and performs historical analysis of system performance, and provides a set of configuration parameters that may be used by the system responsive to the historical analysis. These configuration parameters are in the form of an operational system configuration file that may be used to modify existing operational system configuration files. The matrix controller also provides an asynchronous method for monitoring for virus attacks (in conjunction with intelligent agents within the system that provides synchronous monitoring). The premise behind the operation of the matrix controller is that all information processed by the matrix controller is first converted into images, in a similar fashion to the way that a queue map is a representation of the flow of data through the server system, and similar to the way in which graphs are used to represent large amounts of data. Once the information is translated into images the matrix controller may process the information using intelligent agents that compare images, generated from an optimally tuned system, to images created from snapshots of current system statistics. The matrix controller then reports the differences between these images, in the format of the data that the images were initially created from. For example, the entire server system may be represented by a wire-frame diagram where each component of the system is represented in colors that correspond to vital datum (i.e. bandwidth utilization, transmission times, processing times). This image is then compared against a wire frame diagram of an optimally configured system. The differences in intensity and hues may be determined by using binary comparisons, with gradients of hues and intensity being assigned to actual values, such that an RBG value of 0xFFFFFF (hex) is an optimum system, the current system component has an RBG value of 0xF0E0A0 (hex), so there is a difference of 0x0F1F5F (hex) units between the optimally tuned system and the current snapshot. Chain module 162 is coupled to a database 88 of information for the system, and to gene pool (GXM) 90 that contains a primary database of code for the system.

The Applicant's server system is designed such that generic interface modules ECI, ICI, CM) are used to create chains, local and remote chain segments, and connect to functionality modules (PXM, GXM, MXM, REM, ACM, IAM, IQM, OQM, SCM, CVM, NIM, PIM) to provide functionality to the server system. The functionality modules (that may be "embedded" in the communication interface, or run as separate processes that are accessed via the "CI Thin-Shell" application) typically contain specific code that implements the functionality of the module. The communication interfaces (ECI, ICI, CM), on the other hand, do not contain specifically compiled code to handle communication and interaction with the server system and other communication interfaces integrated in the system. This interaction and communication is handled using rules and rule-sets within the communications interfaces. These rules and rule-sets are separately compiled binary objects that are chained together to accomplish the following interactions within the system:

Message Routing

Rule-sets route messages between the components of a communication interface (input routers, input filters, internal routers, CI controllers, output filters, output routers, and module controllers), between the communication interfaces in a chain, between the chains of a server system, and between external devices, applications, and clients.

Message Generation

Rule-Sets generate messages in response to messages received, in response to changes (triggers) within the components of a CI, the CI, chains, server system, or communication with external devices, applications or clients.

Message Actions

Rule-Sets perform either immediate or delayed actions including (for example) CI integration, CI segregation, transmission of data in specific external protocols with external applications, devices, and/or clients.

Operational System Configuration State Transitions

Rule-sets initiate and govern OSC state transitions by providing "trigger rule-sets" that initiate specific state transitions, and "transitional rule-sets" that approve OSC state transitions. The trigger rule-sets reside within the context of the OSC state initiating the transition, and transitional rule-sets reside within the context of the OSC State being transitioned to. An OSC state transition is not completed until the transitional rule-set passes control to the OSC state processor.

Communication Interface State Transitions

Similar to operational system configuration state transitions, rule-sets are used to initiate and govern state changes within communication interfaces. These state transitioning rule sets exist within the context of the communication interface controller and consist of "trigger rule-sets" that are used to initiate a state change, and "transitional rule-sets" that are used to approve a state transition. A communication interface state transition is not completed until the transitional rule-set passes control to the CI controller's primary control loop.

Message Packaging Operations

Rule-sets are used to assemble messages from information maintained in accessible contexts including the server system context, CI chain(s), CI(s), CI components (input filters, etc.), or message contexts (message headers, message block headers, or data lists maintained within message blocks). Rule-sets are also used to transfer data from the message contexts to accessible contexts including the aforementioned contexts, and modify data within existing message contexts (for example, rule-sets are used to modify timing statistics, source and destination addressing information, and address block information).

Ticket Processing Operations

Rule-sets are used to handle the creation, deletion, authentication, expiration, modification, and transfer of server system tickets within the server system and between external applications, devices and clients.

Addressing Operations

Rule-sets handle the creation, modification, deletion and distribution of communication interface address information within the server system.

Normalize Data Transfer Between Contexts

Rule-sets handle the transfer of data between contexts in a manner that hides the actual operations needed to perform the data transfer. This includes (for example) resolving name/value pairs that are passed by reference (a process that involves querying the PAD for the actual name/value data content), handling any ticket operations (as long as valid tickets exist within a context that is accessible by the rule-set(s)) including authorization, encryption, compression, decryption, and decompression.

Rule Set Architecture

Rule sets are comprised of rules that are in turn comprised of rule primitives. All rule primitives, rules, and rule-sets are stored as binary objects within the gene pool. Rule primitives include (for example) comparison primitives, object primitives, assignment primitives, and branch primitives.

Comparison Primitives

Comparison primitives include, for example, greater than, less than, equal to, and not. These primitives perform comparisons on object primitives.

Object Primitives

Object primitives include, for example, regular expressions, name/value ID's, name/value pairs, binary objects, communication interface ID's, context ID's, contexts, server system ID's, queues, queue pixel maps, regions of queues and queue pixel maps, queue elements, queue pixels, queue pixel primary, access, and location bytes, message ID's, messages, OSC state ID's, rule-set ID's, and rule-sets.

These objects may be used for comparison operations, assignment operations, and branching operations.

Branch Primitives

Branch Primitives include, for example, jump if not equal, jump if equal, jump, call if equal, call if not equal, increment and jump if equal, increment and jump if not equal, decrement and jump if equal, decrement and jump if not equal.

Assignment Primitives

Assignment primitives consist of binary operators and unary operators. Binary operators include, for example, assign, copy, move, append, replace, update, push, pull, and query.

Unary operators include, for example, shift left, shift right, negate, increment, decrement, ascend, descend, jump, and execute.

Rule-Set Processors

Rule-Sets are processed by rule processors found in, for example, communication interfaces, intelligent agents, and specialized functionality communication interface modules (such as the server core module, network interface module, etc.).

Rule-set processors are stack-based interpreters that use data stacks, execution stacks, and dictionaries to interpret and execute rule-sets.

Rule-Set Evolution and Selection

The rule primitives are machine, operating system, and version specific objects that are retrieved by the rule set interpreters when the rule sets are loaded into the various modules and components of the system. The gene pool assembles the rule-sets based on the current operating system, platform, and version of the server system.

Multiple versions of the rule primitives may be created by the provider of the server system or generated automatically by the system in order to provide additional assurance and protection against reverse engineering by customers or entities with malicious intent. If so configured the gene pool will select arbitrary rule primitives to obfuscate the rule-sets.

These rule primitives may also undergo an evolutionary process controlled by the gene pool wherein for example, different versions of rule primitives are tested to determine the most efficient or fastest versions for a specific machine or operating system or operational system configuration and OSC state. So constructed, the gene pool will automatically assemble requested rule-sets based on the most efficient or fastest rule primitives based on the aforementioned example criteria.

Rule-Set Configuration Utility

A specialized functionality communication interface module provides an interface to an external application that is used to create the rules and rule sets that are subsequently loaded into communication interfaces, intelligent agents, and other modules within the system. This utility is a graphically based application that runs under Windows/NT™, X-Windows™, or MacOS™ (for example).

Next, the network interface module (NIM) 30 will be described. A network interface module consists of a communication interface with a specialized module controller and/or functional module. For reference, when the acronym 'NIM' is used, Applicant is speaking to the functionality contained within the module controller and/or functional module attached to the communication interface.

This communication interface family NIM handles all aspects of the connection of external clients, applications, or remote versions of Applicant's system to the system in which the network interface module is integrated into. These aspects include any hardware or protocol handshaking, flow control, error correction, resubmission, and other connection negotiation tasks as specified or required by the external protocol or media that differ substantially from the proprietary protocol used by the applicant's system.

The primary tasks of the network interface module include receiving arbitrary lengths of data from the client and assembling the data into records (as specified/known by the external protocol), and transmitting arbitrary lengths of data as specified by the external protocol to the client. The data that is received will be converted to the applicant's system's proprietary protocol and processed as requests, and the data that is returned to the client will be translated from the system's responses to client requests and potentially unsolicited asynchronous requests by the system, in the Applicant's proprietary protocol. The data that is sent back to the client conforms to the external protocol that the client understands, including connection negotiation, handshaking, flow control, and data lengths.

The network interface module takes the data that is assembled from the client and encapsulates it in a protocol message within the tunneling message block and transmits the message to the protocol interface module (described below). Tunneling is a conventional network term that describes encapsulation of one protocol within another, as would be apparent to one skilled in the art.

The network interface module receives notification of request fulfillments from the server core (also described below) or other components of the system, and receives the result data via the protocol interface module, from the output queue module's associated tree queue (described below).

Next, the protocol interface module (PIM) 40 will be described. A protocol interface module includes of a communication interface with a specialized module controller and/or functional module. For reference, when the acronym 'PIM' is used herein, the applicant is speaking to the functionality contained within the module controller and/or functional module attached to the communication interface. As stated earlier, these modules translate the message from the client protocol to the proprietary protocol of Applicant's system. Messages received by the PIM that contain client data to be translated, contain this data in the 'tunneling message block' of the message. The format of this block consists of a header that specifies the length of the data and a 16-bit cyclic redundancy checksum (CRC) used to ensure integrity of the data that may have been transmitted in separate messages. The PIM extracts the binary data from the tunneling message block and applies a rule set to the data using a stack-based rule set interpreter that is identical in all respects to the rule set processors mentioned previously in the communication interface including method of storage, update, syntax, construction, and distribution. The binary data may contain ASCII, binary values, possess an intrinsic structure conforming to an existing well known external protocol (i.e. SNMP, Z39.50, HTTP, etc.), or conforming to a third party proprietary protocol. The non-intrinsic structures of the protocol, including flow control, negotiation, etc., have been isolated from the data and any intrinsic structures contained therein. The rules that are applied to the binary data consist primarily of pattern comparisons. These pattern rules are based on UNIX REGEX and have been extended to include constructs that are specific to the applicant's system. The rule set interpreter parses the binary data to separate information (as defined in Ray Kurzweill's AGE OF SPIRITUAL MACHINES page 30) from structure (as defined in David Berlinski's 'THE ADVENT OF THE ALGORITHM page 51) and noise (as defined in Ray Kurzweil's book . . . same page). The structure and noise are used to identify the structural elements of the data as it applies to the specified functionality of the message type, and the information is assigned to the structures thus derived. The resulting structure and data is a set of one or more name/value pairs that contain the information (as defined above) from the binary data received in the tunneling message block of the message. This structure and data is collectively called data pairs that are organized into data lists. Data lists are hierarchical structures used to represent the structure of the data from the client. This converted data and structure is then parsed to determine the message type of the client request. Once the message type is determined the PIM authenticates the client and the message to ensure that the message type being generated meets the security restrictions placed on the client or the client connection. The message is then transmitted to the client request/response storage chain where it will be subsequently stored by the input queue module for processing. If the derived message type is configured such that an acknowledgement upon receipt is to be generated by all communication interfaces then the PIM's communication interface will generate this acknowledgement.

The tree queues and input queue module will now be described. The server system uses one tree queue for storing requests from the client and one tree queue for storing responses to be sent back to the client. The input queue module (IQM) and the output queue module (OQM) are used by the server system to access the respective tree queues. Initially, as with all other modules of this type, an external communication interface ECI coupled to chain 100 routes messages to and from the input queue module (IQM). An internal chain interface ICI is coupled to a sub chain linking the input queue module and an agent controller module, within which messages flow in a counterclockwise direction.

Referring to FIG. 22, the input queue module is coupled upstream in chain 100 to a server core 54, is constructed as a communication interface module that maintains information about the other communication interfaces and modules within the system and is aware of what communication interfaces can receive messages. Additionally the server core 54 maintains a copy of the operational paths for all message types understood by the system and is able to assign best-route paths to incoming messages received from the intelligent agents that communicate with the input queue module and tree queue. There may be any number of server cores within a server system and any number of these server cores may be assigned to a collection of communication interfaces collectively known as a server. Additionally these server cores may reside on any combination of machines used by the system. In the event that multiple server cores reside within a server system all server cores will typically be contained within one communication interface chain. If multiple server systems are interconnected (for fault tolerance, load balancing) then communication interface chains will be created for each distinct server system. This flexibility provides "hot backup" functionality that is used to quickly respond to fault conditions within the system.

The command verification module (CVM) 56 is constructed as a communication interface module associated (typically) with primary chain 100. These modules receive messages from the server core(s) and provide a second level of verification to the process of preparing a command for execution. This second level of verification includes ensuring that the communication interfaces specified in the operational path assigned by the server core are functioning and are the best CI's for completing the command execution, ensuring that all required values for successful command completion are provided within the message or conversation for the command execution process are present and valid, and provide default values for commands defined by message type.

The process application data manager (PAD) is the primary storage mechanism within which data and the messages are stored. The PAD handles all retrieval, modification, caching, translation and storage of information. Information is stored, retrieved, and modified using protocol messages of a system type (such that the message types are not modifiable by users of the server system). PAD's may exist on isolated communication interface chains that span multiple machines in a server system. In this manner all requests, modifications, and storage of data may be duplicated to back up systems in a RAID-like schema. PAD's may further be cross-linked between distinct server systems to provide fault tolerance through hot-back up configurations (for example). As with all modules and sub-chains of the system, the PAD is connected to chain 100 (FIG. 22) by an external interface, a chain module and an internal interface.

The matrix connection module (MCM) is constructed as a communication interface module and provides a connection to the matrix controller for the asynchronous historical analysis of system performance by generating and maintaining images that are analyzed by intelligent agents. The analysis of these images is then converted to binary operational system configuration (OSC) files that may be used, by the users of the server system, to modify the operation of the system. During operation the matrix controller performs asynchronous analysis of statistical information from the other components of the system. The matrix controller uses a combination of traditional logic and neural networks to determine optimum configuration settings for the system. The matrix controller observes trends in data flow within the system to forecast anticipated system resource usage and identify previous malicious attacks (I.e. denial of service attacks and/or attempts). In this respect the matrix controller performs functionality similar to the intelligent agents found in the tree queues except that the information that the matrix controller has access to come from all system components and not just the queue image map and tree queues.

The gene pool connector module (GXM) is constructed as a communication interface module and serves as a connection point to the gene pool that is the primary storage mechanism for binary code used within the server system. The gene pool may contain code, which has been compiled for other operating systems and platforms, that is loaded based on the operating system and platform that is running the server system. Additionally the gene pool may contain multiple versions of the same binary objects that are loaded based on version information maintained within the operational system configuration file(s) and/or the communication interfaces.

Binary objects are inserted into the gene pool using a specialized communication interface that has an associated module designed to perform the integration. This module is typically not distributed with the server system but is executed remotely to handle updates of the server system on customer sites by the provider of the server system.

Binary objects are evaluated by specialized communication interface modules, in conjunction with the matrix controller, to determine the binary objects that operate most efficiently on a given system. This evaluation process consists of a diagnostics communication interface module that simulates varying levels of client load. The matrix controller records the statistics (as it does for all communication interfaces) and generates operational system configurations that may be evaluated, for example, by customers. Existing operational system configurations may then be modified to specify the versions of binary objects to use.

Referring to FIG. 25, a block diagram of another embodiment of the present invention is shown. In this embodiment, rather than a single system of several types of components (ACI's) that perform tasks related to both the exchange of information and the configuration/monitoring of internal components, there are two sub-systems that group these functionalities together. The first subsystem is a guardian system (GNS) that handles the configuration of the overall system, and the second is a neutral exchange server subsystem (NES). With respect to the former, the guardian subsystem is responsible for ensuring that the neutral exchange subsystem, and any required or used resources operate as efficiently and dependably as possible. The neutral exchange server subsystem implements the tasks related to functionality required of the system at a particular site. With respect to the guardian system, information such as statistics, status information, and other information is collected using the following methods:

Capturing status messages from components of the neutral exchange subsystem by capturing STDERR output or parsing logs (for example the event log in Windows™, or the /var/log/messages log in Unix™).

Sniffer modules (not shown) installed in any of the primary or secondary chains (FIGS. 22, 25) of the neutral exchange server sub-system that, although actually part of the guardian sub-system, receive and send messages from and to components of the neutral exchange server subsystem. This information is then processed for operational information by the sniffer modules and passed to the guardian subsystem.

By monitoring resources that are used by other components of the system. This might include computer resources, bandwidth utilization, and CPU/memory consumption.

By monitoring resources that are not used by other components of the system. This might include web-servers, DNS servers, firewalls, mail queues, and news feeds. The information that is collected in this manner is then successively filtered by specialized components of the guardian system to condense data into information. This information is then used in one of the following ways:

The information is passed to a matrix controller (a component of the guardian sub-system) where predictive logic is applied to create operational system configurations that are then applied to the neutral exchange server and guardian sub-systems either automatically or upon approval and manual integration.

The information is passed to executors residing within the guardian sub-system that take action based on procedural logic and configurations defined by rule sets. These executors may be configured to adjust system parameters, alter operational system configuration states (OSC States), and/or provide notification by way of cell phones, email, or export to external applications.

The information may be stored for future trend analysis (either via procedural or predictive algorithms). For example a 'round robin database' scheme may be configured to present reports that show trends over time of such things as system usage over the past X hours, days, weeks, etc.

As shown in FIG. 25, one possible configuration of a guardian subsystem 200 and a neutral exchange subsystem 202 is shown. In this configuration, the guardian subsystem 200 may be connected to any ECI of a neutral exchange subsystem 202 such as that previously described and shown in FIG. 22. Here, any ECI of the guardian subsystem chain or loop 200 may communicate with any ECI of subsystem 202 via the bidirectional discovery port, labeled UDP in FIG. 25 (and DISCOVERY in FIG. 20), and may also receive error and status data from any ECI, indicated by STDERR. In addition, an ECI as indicated by ECI 204 may communicate with a conventional network or third party application, such as local servers 206. A matrix controller 208 is coupled in the guardian subsystem chain, and functions as described in the foregoing. An analyzer 210 is coupled in the guardian chain 200 via an ECI 212, and which incorporates logic to perform analysis on incoming data from the status server 213 or any other component of the system. Analyzer 210 may make real time decisions based on rule sets on data taken from other components in the guardian system and other external systems. A guardian router 214 may be connected, typically via the Internet 216, to a remote guardian 218 that resides, for example, on a user's account as a procmail script.

This script parses information out of relevant email messages and forwards the messages to guardian router 214 as an email message. In addition, the remote guardian periodically accesses predetermined web sites, DNS servers or any other resource available over the Internet for monitoring events indicating that there may be a problem within Applicant's system or at other locations accessible by the Internet that may have affected Applicant's system.

Other entities of the guardian subsystem are guardian agents that reside throughout all environments of the system, including those that support NES components and environments where NES components do not reside. These agents are freely transportable throughout the system, depending on where they are needed. Such need is based on functionality requirements of the system at an installed site. For instance, if a site requires that an external website be available, and if the website becomes unavailable then the site (hosting the Applicant's system) is notified, there may be a guardian (218 in FIG. 25) installed external to both sites that monitors availability of the website and transmits e-mail messages to the Applicant's system when the website is unavailable. These guardians are configured, using a rule-based language, to look for changes in the environment and transmit this information to the static components of the guardian system.

Another part of the guardian subsystem are a number of entities referred to as "virile entities". These entities closely resemble computer viruses or worms, and which reside in controlled, secure environments that also host static components of the guardian system (for example, elements 212, 213, 204, and 214 of FIG. 25). The viral entities provide a number of functions such as detecting infestations and attempted infestations by malicious viruses/worms, transmitting accurate process information to agents or static components of the guardian system, including resource (processor, memory, network bandwidth, etc.) usage, encoding/decoding configurable information in to all files and executables in a specific computer, work group, department, or organization to limit access and scope of distribution, masking the true identity of files/executables from known malicious viruses and worms, providing for a configurable level of monitoring at a file or process level, preventing the execution of unauthorized programs, including payloads deposited by virus or worm infestations, pirated software, or high bandwidth applications during peak times, distributing and minimize the overhead that the guardian system requires in order to monitor machines and networks, and providing for faster response time to real time changes in the environments that host the system. In addition, the viruses modify existing applications and data files in order to detect an attempted infestation by a harmful virus at the time it occurs by looking for unauthorized modification to applications and data files, refusing modification and notifying the guardian system of said unauthorized attempts. In addition, viruses as described herein may tag data files with a "footprint" that are recognizable by external third-party applications (like Norton Anti-virus™) and are present to allow cleaning of these viruses. This "footprint" may be a specific sequence of bytes in the virus that never changes and that is published to all software companies that make anti-virus software packages. In addition viruses as described herein may tag date files with an 'Identification code' that are recognizable by applications that are themselves infected by the Applicant's virus. The presence of a recognizable identification code in a data file can be used to enable data files to be opened or used, with the absence of the identification code, or presence of a specific identification code, preventing files from being opened or used. As such, files downloaded from the internet are not authorized to be opened or run until they are infected with the virus of the present invention. In the process of infecting the file, harmful viruses may be found and either removed or quarantined using either hooks to external third-party virus packages (as described above) or through communication with the static guardian system components that must be present on all systems where the Applicant's virus is installed. Such static guardian components may contain a third party application or a proprietary anti-virus software package that are called and applied to the infected (or affected) files.

Referring to FIG. 26, a block diagram of one example of a virus contemplated by the present invention is shown. In this diagram, a payload 250 carries dynamic binary code that contains functionality of the virus. A transport code 252 is executable code that enables the virus to move between applications and systems, and a communications code 254 is executable code the virus uses to communicate with the guardian system. Both transport and communication code is self-modifying in that the code changes on a regular basis to limit the ability of reverse-engineering attempts by malicious entities. At box 256 is a permanent footprint as described above and used to identify the virus to third party anti-virus programs in order to identify the virus as a harmless entity, and provide a means for the removal of the Applicant's virus from the system using said third-party anti-virus packages. At box 258 are stored identity codes used by the system to identify versions of the virus and to provide type/class information to the virus. For example, Department A of an organization may have one classification/type of virus and Department B of the same organization may have another classification/type of virus. Using this scheme Department B personnel might be prevented from accessing documents created by Department A personnel and vice-versa. Likewise, an administrator or supervisor over both Department A and Department B may have a virus classification/type capable of accessing all documents from both departments.

The virile entities of Applicant's system communicate with the Guardian sub-system by way of status servers (213, FIG. 25) that receive connection requests from any component of the NES or GNS sub-system.

In operation, the first step involves the installation of the guardian sub-system within an organization's network. Once components of the guardian sub-system are installed, the Applicant's system is granted authorization to the resources of the organization's network (permission to resources, machines, etc.), and the initial Operational System Configuration is defined. This OSC specifies the machines, network resources, and limitations that are to be placed on the Applicant's system. Once installed the Guardian sub-system uses the OSC to distribute components (such as guardian agents, virile entities, and ECI/Modules of the NES) of the Applicant's system to the machines and resources authorized for use by the NES and GNS sub-systems. Once installed, the guardian subsystem and neutral exchange subsystem may operate independent of each other. As the neural neutral exchange server sub-system fulfills the functionality required by the installation of the Applicant's system at an organization, the Guardian sub-system may monitor all components and resources to ensure efficient operation of the overall installation. For example, if the functionality requirements placed on the Applicant's system requires integration of a third party security system with the computers and resources of the organization, then a remote guardian (218, FIG. 25) may be installed as a procmail script at an Internet Service Provider's site that receives mail messages from the third party security packages' web-server and routes these messages to the Applicant's system by way of the guardian router (214, FIG. 25). Once received by the guardian system these messages are transferred to the analyzer (210) that in turn collates information from the servers located on the organization's internal network (206) using the local guardian (204) to determine whether security alerts reported by the third party's security package indicate actual intrusions. While this and other server functions are occurring the guardian system may be monitoring the internet connections by collecting data and information from guardians that are measuring bandwidth utilization and availability of the network connection. In the event that an internet connection becomes unavailable the guardian system may reconfigure components of the NES/GNS sub-systems to use alternate network connections to transfer information between an organization's internal network and the remote guardian installed on an ISP's machine.

After having thus described my invention and the manner of its use, it should be apparent to one skilled in the art that incidental changes may be made thereto that fairly fall within the scope of the following appended claims, wherein I claim:

The invention claimed is:
1. A server network, comprising:
 a plurality of modules;
 a plurality of communication interfaces that are connected to the modules, where the communications interfaces are linked together in at least one loop where the communication interfaces transfer system messages and client messages between the modules;
 an input tree queue and an output tree queue each configured as an N dimensional image map wherein discrete pixels therein contain information about respective ones of system messages and client messages, and further wherein said information about respective ones of said system messages and said client messages are spatially indexed in said image map according to their meaning, with at least a portion of said meaning residing in at least one pixel in said image map, said information about said system messages and said client messages being transferred between said input tree queue and said output tree queue,
 at least one autonomous program for re-configuring assets of the server network to optimize network performance based on monitoring of said input tree queue and said output tree queue.

2. The network of claim 1 where pixels containing said meaning are organized in patterns according to relationships between other messages and system properties.

3. The network of claim 2 where color and intensity of said pixels are indicative of said meaning contained in those said pixels.

4. The network of claim 3 where said meaning about each of said system messages comprises a type of each said system message and function of each said system message.

5. The network of claim 4 where types of said system messages comprises at least one of the following:
 a nexus pointer;
 a message queue; or
 a message path.

6. The network of claim 4 where functions of said system messages comprise at least one of the following:
 critical information;
 access information; and
 location information.

7. The network of claim 3 where said image map of a respective said input tree queue and said output tree queue indicate changes relevant to a respective said tree queue for monitoring of network performance.

8. The network of claim 3 where said input tree queue and said output tree queue are displayed for visual monitoring of said patterns by a system administrator.

9. The network of claim 7 wherein said autonomous program is at least one intelligent agent for monitoring the input tree queue and the output tree queue, said at least one intelligent agent responsive to changes, in at least one of the group of said patterns, said color and said intensity of said pixels containing said meaning for modifying said input tree queue and said output tree queue to optimize said system performance.

10. The network of claim 9, where said at least one intelligent agent re-configures the network to optimize network performance using at least one of the group of a color filter, a color intensity filter and a pattern map.

11. The network of claim 7 wherein said input tree queue and said output tree queue are N-dimensional structures represented by a plurality of layers of said image maps, and further comprising a plurality of intelligent agents, each intelligent agent of said plurality of intelligent agents configured for acting on at least one layer of said layers of said image maps, and each said intelligent agent provided with at least one of the group of a pattern map for detecting and acting on a selected pattern of said pixels, a color filter for detecting and acting on one or more selected colors of said pixels, and an intensity detector for detecting and acting on an intensity of at least one of said colors.

12. A server network, comprising:

a plurality of system modules;

means for communicating between the system modules including a plurality of communication interfaces connected to the modules, where the communications interfaces are linked together in at least one loop and transfer system messages and client messages between the modules;

means for monitoring network performance further comprising an input tree queue and an output tree queue each configured as an N dimensional image nap wherein discrete pixels therein contain information about respective ones of said system messages and said client messages, and further wherein said information about said system messages and said client messages are spatially indexed in said image map according to their meaning and organized in patterns according to relationships between other messages and system properties, with at least a portion of said meaning residing in color and intensity of at least one pixel in said image map, said information about said system messages and said client messages being transferred between said input tree queue and said output tree; and means for re-configuring assets of the server network to optimize network performance based on results from the means for monitoring network performance.

13. A server network as set forth in claim 12 wherein said N dimensional image map further comprises a plurality of layers of 2 dimensional image maps.

14. A server network as set forth in claim 12 wherein said means for reconfiguring said assets of said server network further comprises at least one intelligent agent provided with at least one of the group of a color filter, a color intensity filter, and a pattern map, for sensing changes in said patterns, said color and said intensity.

* * * * *